(12) United States Patent
Sekiya

(10) Patent No.: US 8,090,500 B2
(45) Date of Patent: Jan. 3, 2012

(54) CONTROL DEVICE FOR A VARIABLE DAMPER

(75) Inventor: Shigenobu Sekiya, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1030 days.

(21) Appl. No.: 11/987,950

(22) Filed: Dec. 6, 2007

(65) Prior Publication Data

US 2008/0140285 A1 Jun. 12, 2008

(30) Foreign Application Priority Data

Dec. 6, 2006 (JP) .................................. 2006-328963
Mar. 20, 2007 (JP) .................................. 2007-072326
Apr. 10, 2007 (JP) .................................. 2007-102546

(51) Int. Cl.
*B60G 17/016* (2006.01)

(52) U.S. Cl. ...... 701/38; 701/37; 280/5.5; 280/124.108; 280/5.507; 280/5.512; 280/5.514; 318/611; 318/623; 355/35; 355/72; 188/378; 720/684

(58) Field of Classification Search ................ 701/37, 701/38; 280/5.5, 124.108, 5.507, 5.512, 280/5.514, 5.515; 355/53, 72; 318/611, 318/623; 188/378; 720/684
See application file for complete search history.

(56) References Cited

U.S. PATENT DOCUMENTS

| | | | | |
|---|---|---|---|---|
| 4,948,163 A | * | 8/1990 | Kikushima et al. | 280/5.51 |
| 4,949,989 A | * | 8/1990 | Kakizaki et al. | 280/5.519 |
| 4,984,819 A | * | 1/1991 | Kakizaki et al. | 188/266.7 |
| 5,133,574 A | * | 7/1992 | Yamaoka et al. | 280/5.519 |
| 6,260,675 B1 | | 7/2001 | Muhlenkamp | |
| 7,131,654 B2 | * | 11/2006 | Sakai | 280/159 |
| 7,526,665 B2 | * | 4/2009 | Kim et al. | 713/500 |
| 2005/0040574 A1 | * | 2/2005 | Ivers et al. | 267/113 |
| 2006/0224287 A1 | * | 10/2006 | Izawa et al. | 701/37 |
| 2007/0029711 A1 | * | 2/2007 | Ehara et al. | 267/64.28 |
| 2009/0043452 A1 | * | 2/2009 | Sekiya | 701/40 |
| 2009/0112402 A1 | * | 4/2009 | Furuichi et al. | 701/38 |
| 2009/0248247 A1 | * | 10/2009 | Furuichi et al. | 701/37 |

FOREIGN PATENT DOCUMENTS

| | | |
|---|---|---|
| JP | 8-108727 A | 4/1996 |
| JP | 2006069527 | 3/2006 |
| JP | 2006-273225 A | 10/2006 |
| JP | 2006273223 | 10/2006 |

* cited by examiner

*Primary Examiner* — James Trammell
*Assistant Examiner* — McDieunel Marc
(74) *Attorney, Agent, or Firm* — Arent Fox, LLP

(57) ABSTRACT

In a control device for controlling a variable damper of a vehicle suspension system, when a stroke speed of the damper is within a range including a zero stroke speed, the target damping force is determined as a force opposing a current movement of the damper without regards to the direction of the target damping force determined by a target damping force determining unit. Thereby, even when the wheels move vertically at short intervals, the control value is prevented from changing rapidly, and this allows a damping force of an appropriate level to be achieved in a stable manner at all times. Also, the target damping force when a stroke speed of the damper is within a range including a zero stroke speed may be selected to be a relatively high value or low value so that a desired vehicle behavior may be achieved.

11 Claims, 20 Drawing Sheets

PRIOR ART

CONTROL DEVICE FOR A VARIABLE DAMPER

TECHNICAL FIELD

The present invention relates to a control device for a variable shock absorber or damper, and in particular to a technology for producing a damping force of an appropriate level when the damper is undergoing a movement of a small stroke.

BACKGROUND OF THE INVENTION

Various forms of variable dampers have been proposed for use in wheel suspension systems for the purposes of improving the ride quality and achieving a favorable motion stability of the vehicle. In a common conventional variable damper, a rotary valve is incorporated in the piston for varying an effective area of an orifice that communicates the two chambers on either side of the piston with each other, and such a rotary valve is typically actuated mechanically by using a suitable actuator. More recently, it has become more common to use magneto-rheological fluid (MRF) for the actuating fluid of the damper, and control the viscosity of the fluid by supplying corresponding electric current to a magnetized liquid valve (MLV) which is incorporated in the piston. According to such an arrangement, the overall structure can be simplified, and the response property of the damper can be improved. See U.S. Pat. No. 6,260,675, Japanese patent laid open publication No. 2006-069527 and Japanese patent laid open publication No. 2006-273223, for instance. The contents of these prior art references are hereby incorporated in this application by reference.

In a typical control process for an MRF variable damper, a damper control device determines a target damping force for each wheel according to the lateral acceleration and fore-and-aft acceleration of the vehicle body, and determines the target value of the drive electric current (target electric current) that is to be supplied to the MLV according to the target damping force and the stroke speed of the damper. When the vehicle is in motion, the outputs of the sensors for detecting lateral acceleration and fore-and-aft acceleration inevitably include low level noises, and such noises may cause the target damping force to be excessively great or small. In particular, when the vehicle is traveling straight at a constant speed, because the absolute values of the lateral acceleration and fore-and-aft acceleration are small, the influences of such small noises may become significant, and may prevent the ride quality and motion stability of the vehicle from being favorably controlled. Japanese patent laid open publication No. 2000-273223 discloses a method in which the changes in the damping force are reduced when the stroke speed of the damper is near zero by reducing the target current from the normal level.

This previous proposal however has the problem that the drive electric current changes excessively rapidly under certain conditions. For instance, when the vehicle is traveling at a high speed, each wheel moves vertically by a short stroke at a high frequency, and this causes a corresponding rapid contraction and extension of the damper at a high frequency. This in turn causes such rapid changes in the drive electric current for the MLV that the damper becomes unable to provide a stable damping force. This is due to the fact that a damper is not able to produce a positive damping force even though the target damping force may be positive if the stroke speed is negative. Under such a condition, the previously proposed system reduces the drive electric current to zero. Therefore, when the damper undergoes a small stroke movement at a high frequency, the level of the drive electric current for the MLV tends to change rapidly. This is demonstrated in the graph of FIG. 24. This not only prevents a stable damper control but also applies undesired stress to the drive circuit for the MLV which adversely affects the damper control device.

There is also a demand to control the damping force so as to simultaneously achieve various control modes, such as those of the skyhook control, roll control, pitch control and so on. If such plural control modes can be achieved without sacrificing any one of the control modes, it would be possible to further improve the behavior of a vehicle than was possible with any prior control mode.

BRIEF SUMMARY OF THE INVENTION

In view of such problems of the prior art and based on such recognition by the inventor, a primary object of the present invention is to provide a control device for a variable damper that can produce a damping force of an appropriate level when the damper is undergoing a movement of a small stroke.

A second object of the present invention is to provide a control device for a variable damper that can produce a damping force in a stable manner at all times.

According to the present invention at least some of the objects can be accomplished by providing a control device for controlling a variable damper of a vehicle suspension system, comprising: at least one sensor for detecting a dynamic state of a vehicle and a stroke sensor for detecting a movement of the damper; a target damping force determining unit for computing a target damping force of a vehicle, the target damping force being selectively directed in a contracting direction and an extending direction of a movement of the damper; and a control value determining unit for computing a control value of the damper according to the target damping force determined by the target damping force determining unit and a stroke speed detected by the stroke sensor, the control value being determined in such a manner that the target damping force is directed as a force opposing a current movement of the damper without regards to the direction of the target damping force determined by the target damping force determining unit when the stroke speed of the damper is within a range including a zero stroke speed.

Thereby, even when the wheels move vertically at short intervals, the control value is prevented from changing rapidly, and this allows a damping force of an appropriate level to achieved in a stable manner at all times.

Typically, the device comprises a plurality of target damping force determining units based on different control modes and each providing a corresponding target damping force, and, when the stroke speed of the damper is outside the range including a zero stroke speed, the target damping force is selected in such a manner that the target damping force determining unit selects one of the target damping forces which is largest in value for an extending movement of the damper, the selected target damping force being zero if the largest of the target damping forces is given as a force opposing a contracting movement of the damper, and the target damping force determining unit selects one of the target damping forces which is smallest in value for a contracting movement of the damper, the selected target damping force being zero if the largest of the target damping forces is given as a force opposing an extending movement of the damper. Thereby, even when the device comprises a plurality of target damping force determining units based on different control modes, a highly consistent control can be performed at all times. This again contributes to generating a damping force of an appropriate level in a stable manner at all times.

According to a preferred embodiment of the present invention, the device comprises a plurality of target damping force determining units based on different control modes and each providing a corresponding target damping force, and, when the stroke speed of the damper is within the range including a zero stroke speed, the target damping force is selected as a larger of the largest of the absolute values of the target damping forces in the damper extending direction and the largest of the absolute values of the target damping forces in the damper contracting direction, the damping force is determined as a relatively high value. This contributes to a stable motion control of the vehicle.

According to another embodiment of the present invention, the device comprises a plurality of target damping force determining units based on different control modes and each providing a corresponding target damping force, and, when the stroke speed of the damper is within the range including a zero stroke speed, the target damping force is selected as a smaller of the largest of the absolute values of the target damping forces in the damper extending direction and the largest of the absolute value of the target damping forces in the damper contracting direction. This contributes to a favorable ride quality of the vehicle.

According to a certain aspect of the present invention, the device may a plurality of target damping force determining units based on different control modes and each providing a corresponding target damping force, and, when the stroke speed of the damper is within the range including a zero stroke speed, the target damping force may be selected as an average value of the absolute values of the target damping forces in either direction. A wide range of averaging methods including weighted averaging methods may be used. For instance, the target damping force may be selected as an average of the largest of the absolute values of the target damping forces in the damper extending direction and the largest of the absolute values of the target damping forces in the damper contracting direction. Thereby, both the motion stability and ride quality of the vehicle may be improved.

According to a certain aspect of the present invention, the device comprises a plurality of target damping force determining units based on different control modes and each providing a corresponding target damping force, and when the stroke speed has moved on from a damper contracting side to the prescribed range, the target damping force is selected as a larger of the largest of the absolute values of the target damping forces in the damper extending direction and the largest of the absolute values of the target damping forces in the damper contracting direction when a change rate of the stroke speed is greater than a prescribed threshold value, and a smaller of the largest of the absolute values of the target damping forces in the damper extending direction and the largest of the absolute values of the target damping forces in the damper contracting direction when a change rate of the stroke speed is smaller than a prescribed threshold value; and when the stroke speed has moved on from a damper extending side to the prescribed range, the target damping force is selected as a smaller of the largest of the absolute values of the target damping forces in the damper extending direction and the largest of the absolute values of the target damping forces in the damper contracting direction when a change rate of the stroke speed is greater than a prescribed threshold value, and a larger of the largest of the absolute values of the target damping forces in the damper extending direction and the largest of the absolute values of the target damping forces in the damper contracting direction when a change rate of the stroke speed is smaller than a prescribed threshold value.

Thereby, when the direction of the damper stroke speed is anticipated to change soon, the direction of the target damping force can be changed in anticipation of the change in the damper stroke speed so that the delay in the control response owing to the time lag in the rise of the control value such as drive electric current can be avoided.

According to another aspect of the present invention, when the stroke speed has moved on from a damper contracting side to the prescribed range, the target damping force is selected as a smaller of the largest of the absolute values of the target damping forces in the damper extending direction and the largest of the absolute values of the target damping forces in the damper contracting direction; and when the stroke speed has moved on from a damper extending side to the prescribed range, the target damping force is selected as a larger of the largest of the absolute values of the target damping forces in the damper extending direction and the largest of the absolute values of the target damping forces in the damper contracting direction. Thereby, the influences of noises in the output of the sensor for detecting the dynamic state of the vehicle on the control action for improving the ride quality and motion stability of the vehicle can be minimized.

When the control value determined by the target damping force determining unit according to a given target damping force is reduced from a normal value when the stroke speed of the damper is within a range including a zero stroke speed, the change in the control value such as drive electric current can be reduced for a given change in the target damping force when the stroke speed is near zero, and this also reduces the influences of noises. Thereby, the ride quality of the vehicle can be improved.

According to yet another embodiment of the present invention, the device further comprises a means for detecting an oscillating frequency of the damper stroke, and, when the stroke speed of the damper is within a range including a zero stroke speed and the oscillating frequency of the damper stroke is determined to be about equal to or higher than an unsprung mass resonant frequency, at least one of two measures is taken, the measures consisting of narrowing the prescribed range and reducing the control value determined by the target damping force determining unit according to a given target damping force from a normal value is taken. Thereby, the overshooting and undershooting of the damping force immediately after the changes in the stroke sign or direction can be effectively avoided.

According to yet another embodiment of the present invention, the device further comprises a means for anticipating at least one of a rolling motion and a pitching motion of the vehicle, and, when the stroke speed of the damper is within a range including a zero stroke speed and at least one of a rolling motion and a pitching motion of the vehicle is anticipated, at least one of two measures is taken, the measures consisting of broadening the prescribed range and increasing the control value determined by the target damping force determining unit according to a given target damping force from a normal value. Thereby, the damping force can be improved before the rolling movement or pitching movement actually starts, and this is effective in favorably controlling the behavior of the vehicle, and improve the responsiveness of the vehicle with respect to a steering action and an accelerating action.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
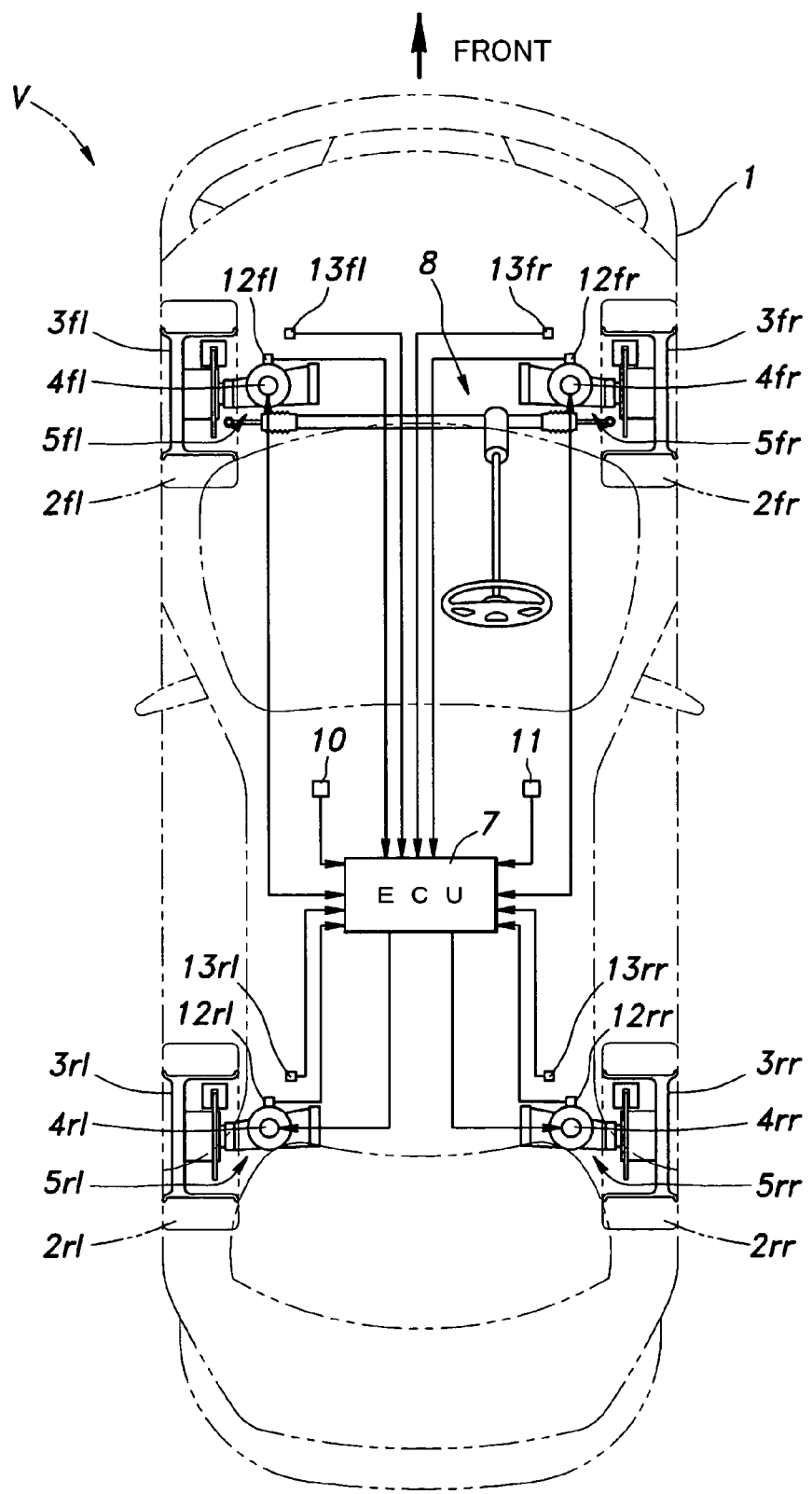
FIG. 1 is a simplified diagram of a passenger vehicle to which the present invention is applied.
Figure 2:
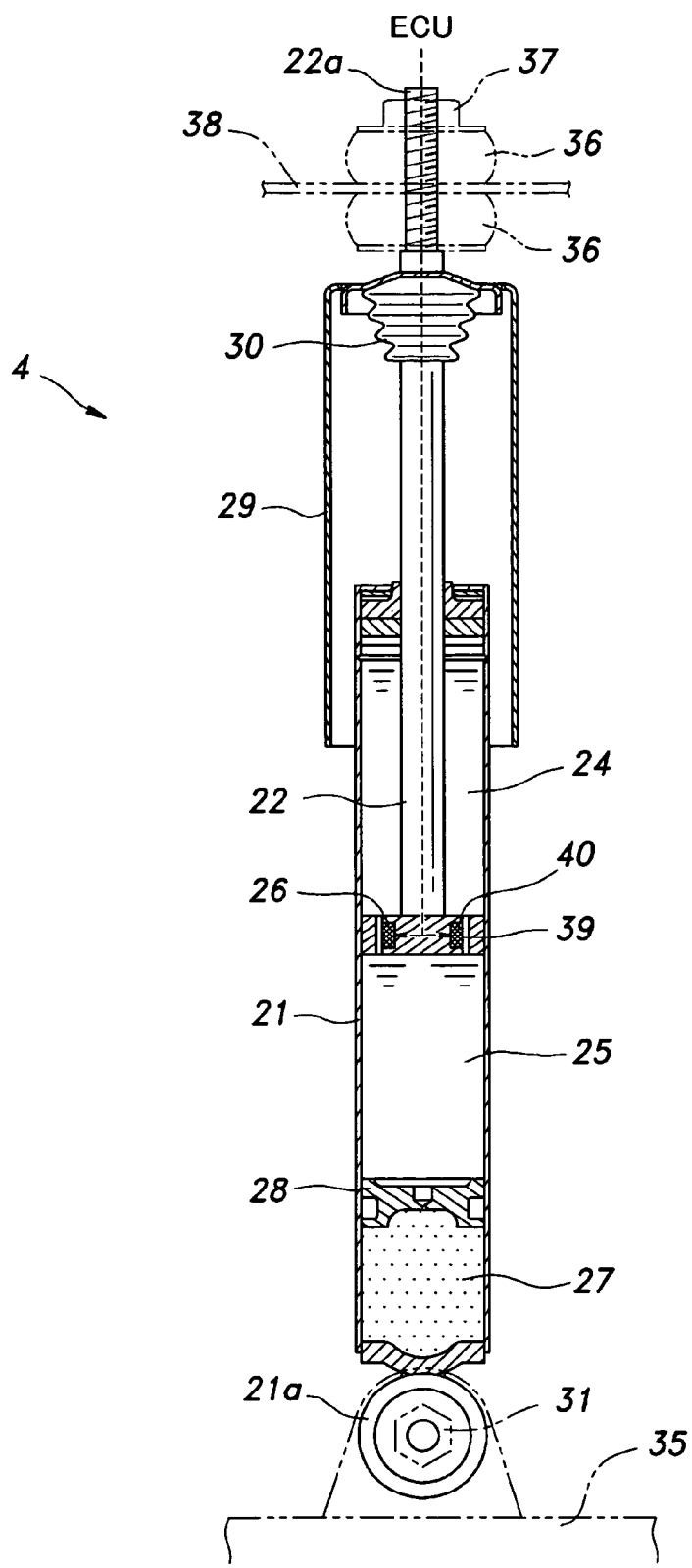
FIG. 2 is a vertical sectional view of the damper to which the present invention is applied.
Figure 3:
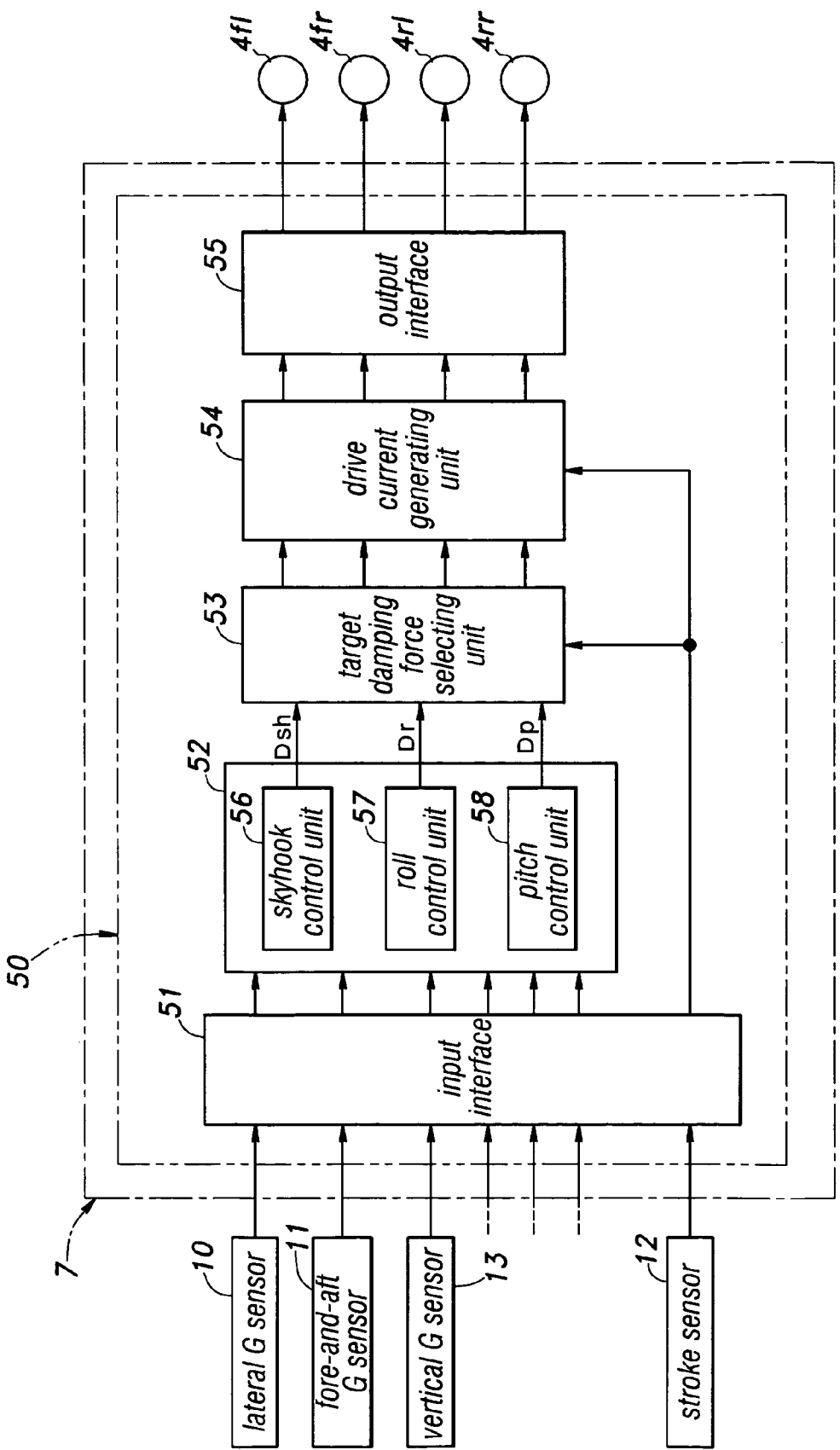
FIG. 3 is a block diagram showing the general structure of the damper control device embodying the present invention.

FIG. 1 is a simplified diagram of a passenger vehicle V to which the present invention is applied, FIG. 2 is a vertical sectional view of the damper to which the present invention is applied, and FIG. 3 is a block diagram showing the general structure of the damper control device embodying the present invention.

Referring to FIG. 1, the illustrated vehicle comprises four wheels 3 which are denoted with numerals 3fl, 3fr, 3rl and 3rr, the suffixes indicating the four different positions of the wheels while numeral 3 generally denotes the wheels. The components associated with each wheel are similarly denoted by using the same notation system.

The vehicle V thus includes four wheels 3 each fitted with a pneumatic tire 2, and each wheel 3 is supported by the vehicle body 1 via a corresponding suspension system 5 including suspension arms, a spring, a MRF damper 4 and other components. The vehicle V additionally comprises a ECU (electronic control unit) 7 for controlling the suspension systems, an EPS (electric power steering system) 8, a lateral G sensor 10 and a fore-and-aft G sensor 11. For each wheel 3 are provided a stroke sensor 12 for detecting the displacement of the corresponding damper 4 and a vertical G sensor 13 for detecting the vertical acceleration of a part adjacent to the corresponding wheel house.

The ECU 7 comprises a microcomputer, ROM, RAM, a peripheral circuit, an input/output interface and various drivers, and is connected to the dampers 4 and the various sensors 10 to 13 via a communication line such as CAN (controller area network).

As shown in FIG. 2, each damper 4 of the illustrated embodiment consists of a mono-tube type comprising a cylindrical cylinder 21 filled with MRF, a piston rod 22 extending out of the cylinder 21 in a slidable manner, a piston 26 attached to the inner end of the piston rod 22 and separating the interior of the cylinder 21 into an upper chamber 24 and a lower chamber 25, a free piston 28 defining a high pressure gas chamber 27 in a lower part of the cylinder 21, a cylindrical cover 29 having a larger inner diameter than the outer diameter of the cylinder 21 and attached to the piston rod 22 in a coaxial relationship to protect the piston rod 22 from contamination, and a bump stopper 30 attached to the piston rod 22 to define the limit of the movement of the damper 6 at the time of full bound in a resilient manner.

The lower end of the cylinder 21 is connected to a bracket formed in the upper surface of a corresponding trailing arm 35 via a bolt 31 passed through the bracket and an eyepiece 21a formed in the lower end of the cylinder 21. The upper end of the piston rod 22 is provided with a threaded portion 22a which is connected to a damper base 38 (formed in an upper part of a wheel house) via a pair of rubber bushes 36 interposing a damper base member and a nut 37 threaded onto the threaded portion 22a of the piston rod 22.

The piston 26 is provided with an annular passage 39 communicating the upper chamber 24 and the lower chamber 25 with each other and an MLV coil 40 provided immediately radially inwardly of the annular passage 39. When electric current is supplied to the MLV coil 40 by the ECU 7, the MRF flowing through the annular passage 39 is subjected to a magnetic field which forms clusters of the chains of magnetic particles in the MRF and increases the effective viscosity of the MRF flowing through the annular passage 39.

As illustrated in FIG. 3, a damper control device 50 is incorporated in the ECU 7. The damper control device 50 comprises an input interface 51 to which the sensors 10 to 13 are connected, a damping force determining unit 52 for determining the target damping force of each damper 4 according to the detection signals obtained from the sensors 10, 11 and 13, a target damping force selecting unit 53 for selecting one of three target damping forces received from the damping force determining unit 52 according to the detection signal from each stroke sensor 12, a drive electric current generating unit 54 for generating the drive electric current for each damper 4 (MLV coil 40) according the corresponding target damping force selected by the target damping force selecting unit 53 and the detection signal from the corresponding stroke sensor 12 and an output interface 55 for supplying the drive electric current generated by the drive electric current generating unit 54 to each damper 4. The damping force determining unit 52 comprises a skyhook control unit 56 for performing a skyhook control, a roll control unit 57 for performing a roll control, a pitch control unit 58 for performing a pitch control, and, optionally, other control units.

The control process according to a first embodiment of the present invention is described in the following with reference to the flow chart of FIG. 4. When the vehicle is in motion, the damper control unit 50 executes a damping force control shown in FIG. 4 at a prescribed processing interval (10 ms, for instance). First of all, the dynamic state of the vehicle V is determined according to the acceleration of the vehicle obtained by the lateral G sensor 10, fore-and-aft G sensor 11 and vertical G sensors 12, the vehicle speed obtained by a vehicle speed sensor (not shown in the drawing) and a steering speed obtained by the steering angle sensor (not shown in the drawing) in step S1. From the dynamic state of the vehicle, a skyhook control target value Dsh for each damper 4 is computed in step S2, a roll control target value Dr for each damper 4 is computed in step S3, and a pitch control target value Dp is computed for each damper 4 in step S4.

Figure 5:
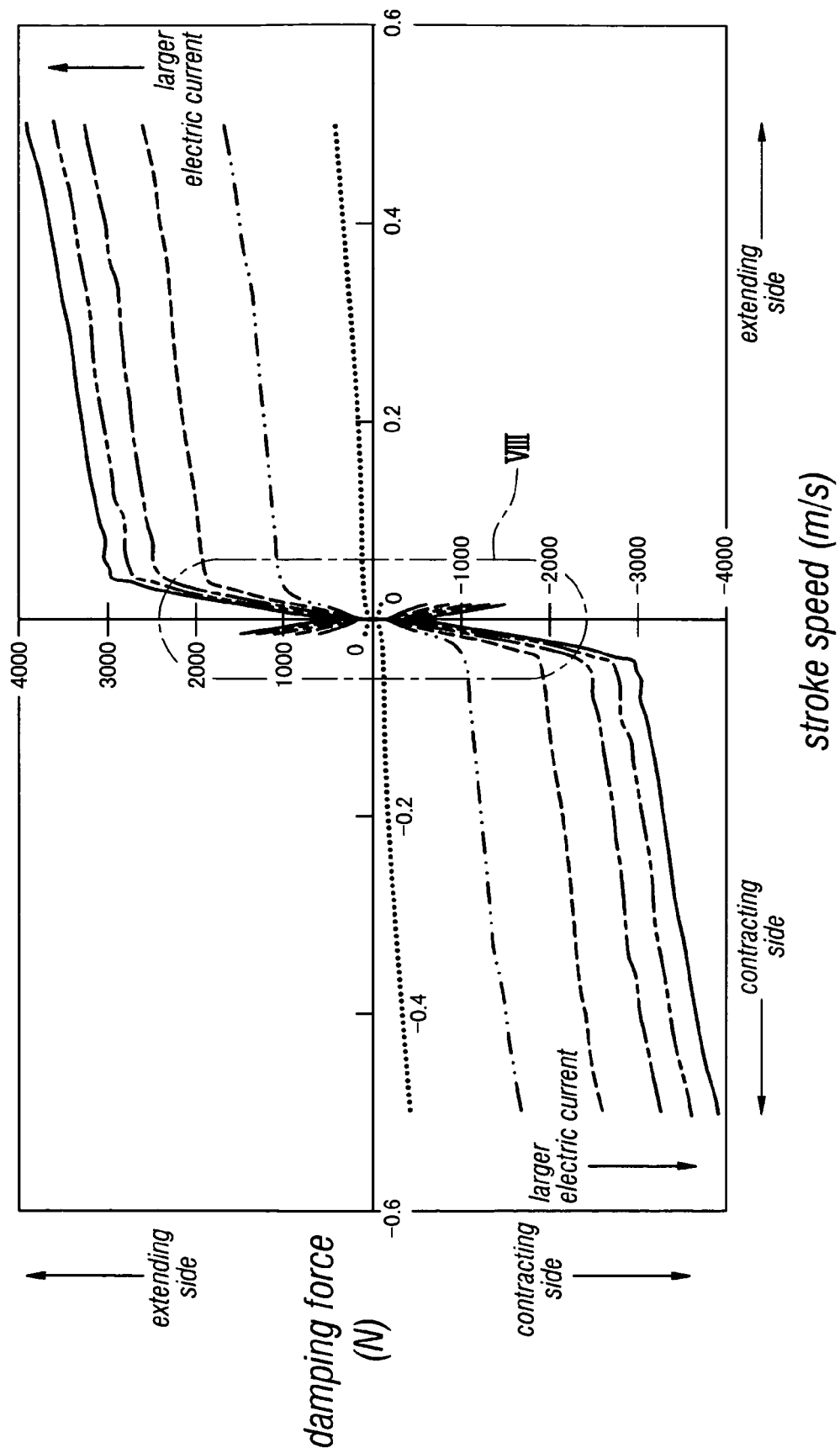
FIG. 5 is a graph showing the drive electric current map in the first embodiment of the present invention.

The damper control unit 50 then determines if the absolute value of the stroke speed Ss of each damper 4 has exceeded a determination threshold value Ssth (if the stroke speed Ss is within a prescribed range that includes the zero value) in step S5. If this determination result is Yes, it is determined in step S6 if the stroke speed Ss is positive. If this determination result is Yes (or the damper 4 is extending), the largest value of the three control target values Dsh, Dr and Dp is selected as the target damping force Dtgt in step S7. If the largest value is negative in value, the damper control device 50 sets the target damping force Dtgt to zero. Thereafter, the damper control device 50 looks up a target current Itgt from a drive electric current map shown in FIG. 5 in step S8, and supplies a corresponding drive electric current to the MLV coil 40 of the corresponding damper 4.

If the determination result in step S6 is No, or the stroke speed Ss is negative, and the damper is contracting, the smallest value of the three control target values Dsh, Dr and Dp is selected as the target damping force Dtgt in step S10. If the smallest value is positive in value, the damper control device 50 sets the target damping force Dtgt to zero. Thereafter, the damper control device 50 looks up a target current Itgt from a drive electric current map shown in FIG. 5 in step S8, and supplies a corresponding drive electric current to the MLV coil 40 of the corresponding damper 4.

Figure 6:
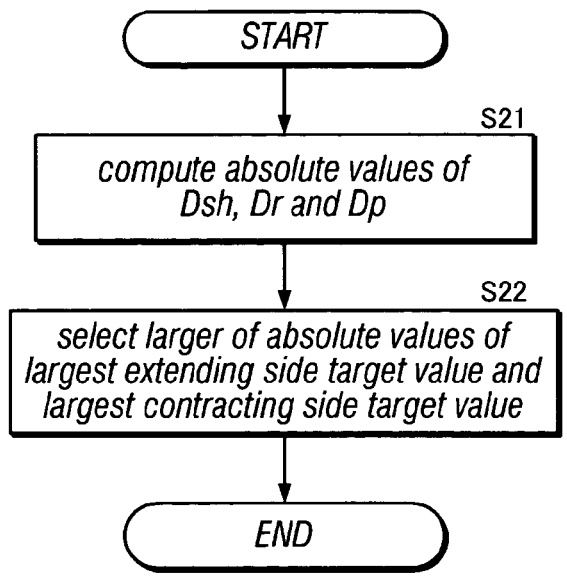
FIG. 6 is a flowchart showing the control flow of the process of determining the target damping force in the first embodiment of the present invention.

If the stroke speed Ss of each damper 4 is below the determination threshold value Ssth (if the stroke speed Ss is within a prescribed range that includes the zero value) or the determination result of step S5 is No, the damper control device 50 executes a target damping force determining process shown in the flowchart of FIG. 6 in step S11. Upon starting the target damping force determining process, the damper control device 50 computes the absolute values |Dsh|, |Dr| and |Dp| of the three control target values Dsh, Dr and Dp in step S21, and selects the larger of the largest of the absolute values of the target damping forces in the damper extending direction (extension target damping force—the skyhook control target value Dsh in the illustrated embodiment) and the largest of the absolute value of the target damping forces in the damper contracting direction (contraction target damping force—the pitch control target value Dp in the illustrated embodiment) as the final target damping force Dtgt (skyhook control target value Dsh in the illustrated embodiment) as shown in step S22 of the flowchart in FIG. 6.

Figure 7:
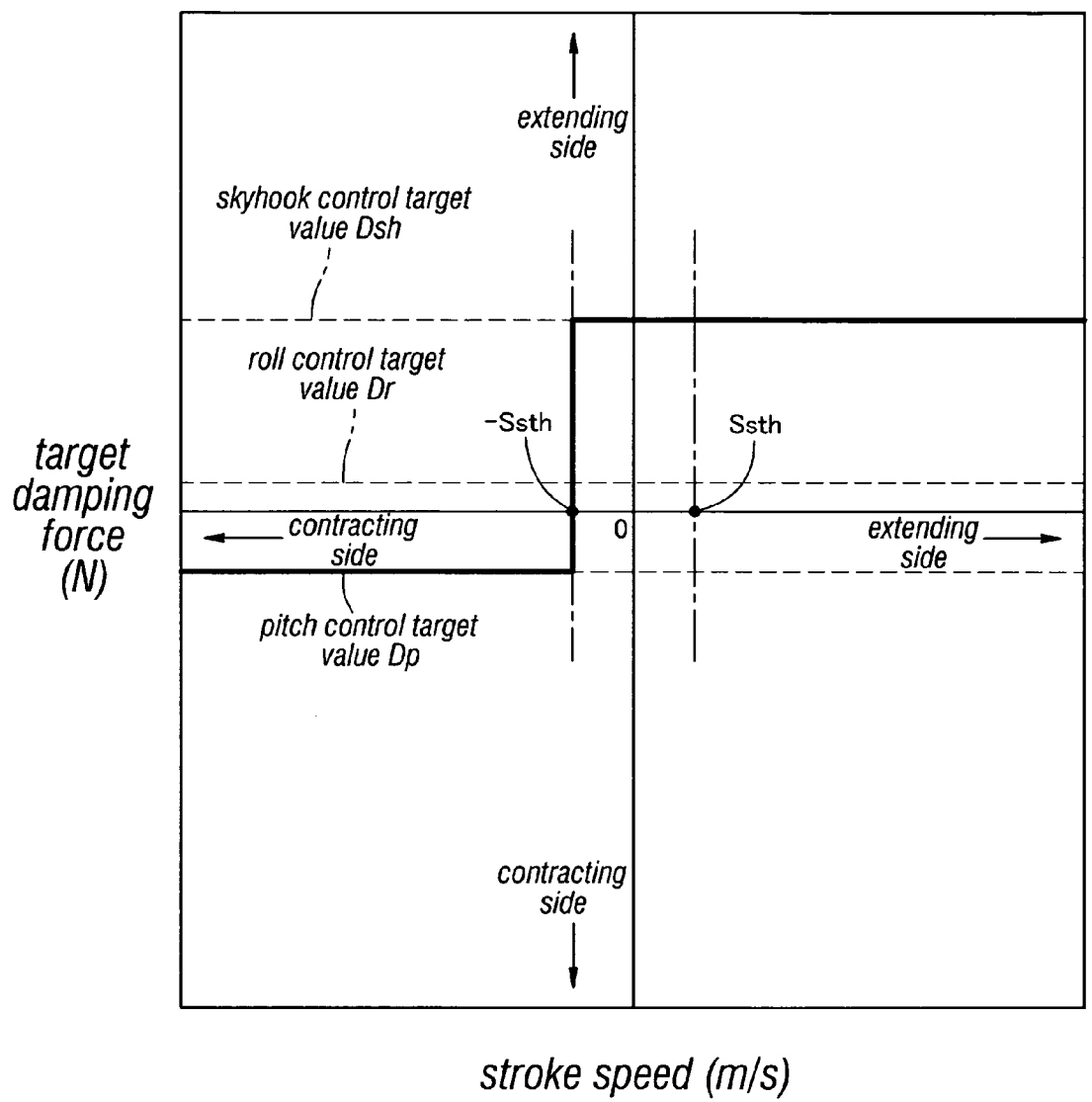
FIG. 7 is a graph showing the relationship between the damper stroke speed and the target damping force in the first embodiment of the present invention.

This is illustrated in the diagram of FIG. 7 which shows the target damping force, when the stroke speed is in the prescribed range (−Ssth<Ss<Ssth), is made equal to that of the damping force for the extending side which is the larger of the largest of the absolute values of the target damping forces in the damper extending direction and the largest of the absolute value of the target damping forces in the damper contracting direction. Therefore, when the stroke speed Ss is near zero, the target damping force Dtgt is determined as a relatively large value, and this is effective in controlling the changes in the attitude and motion stability of the vehicle.

It should be noted that if the three target damping forces have a same sign, for instance are all in the extending side, the largest of the absolute values of the target damping forces in the damper contracting direction will be given as zero. Conversely, if the three target damping forces are all in the contracting side, the largest of the absolute values of the target damping forces in the damper extending direction will be given as zero.

Figure 4:
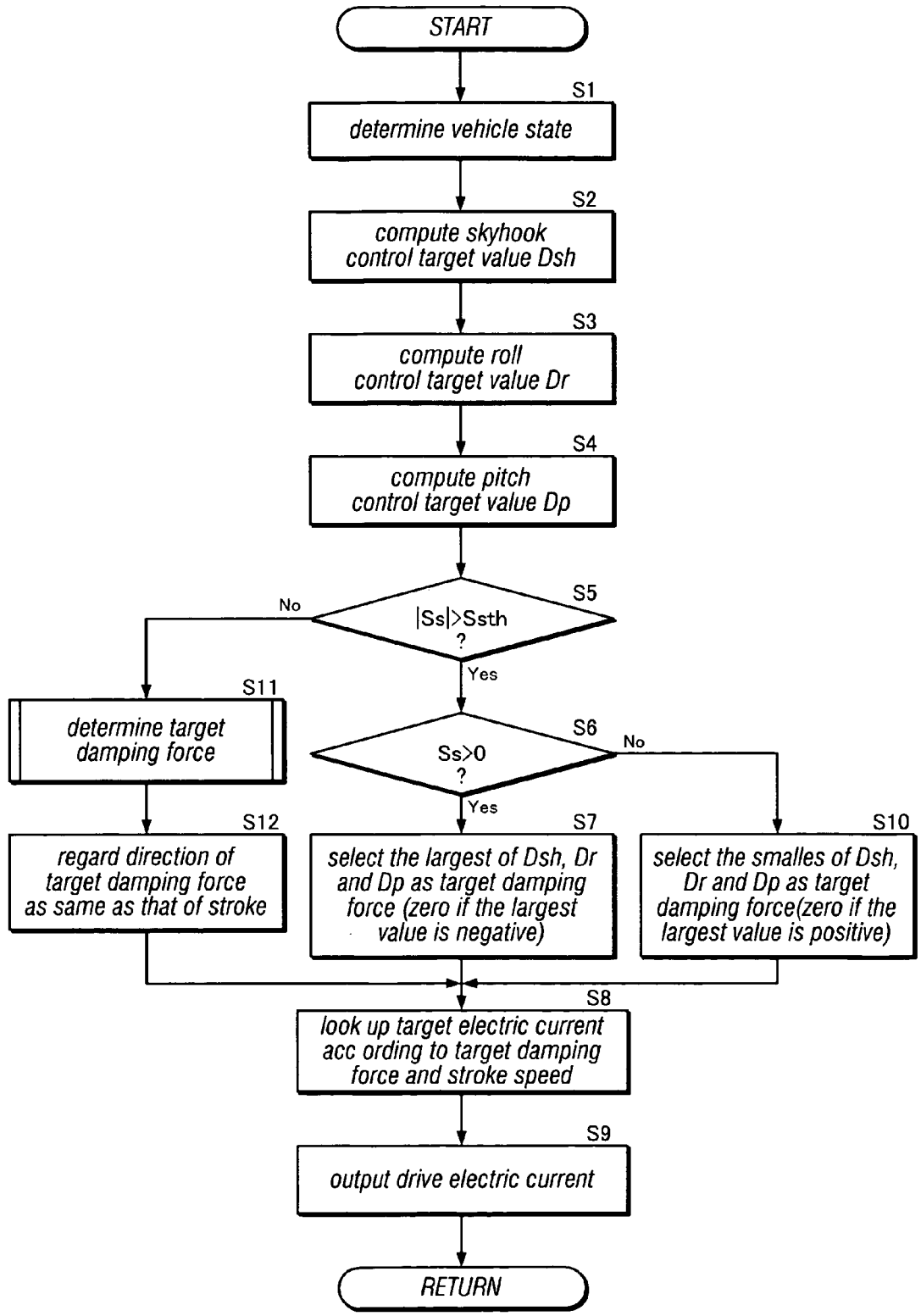
FIG. 4 is a flowchart showing the overall control flow of the damping force control embodying the present invention.
Figure 8:
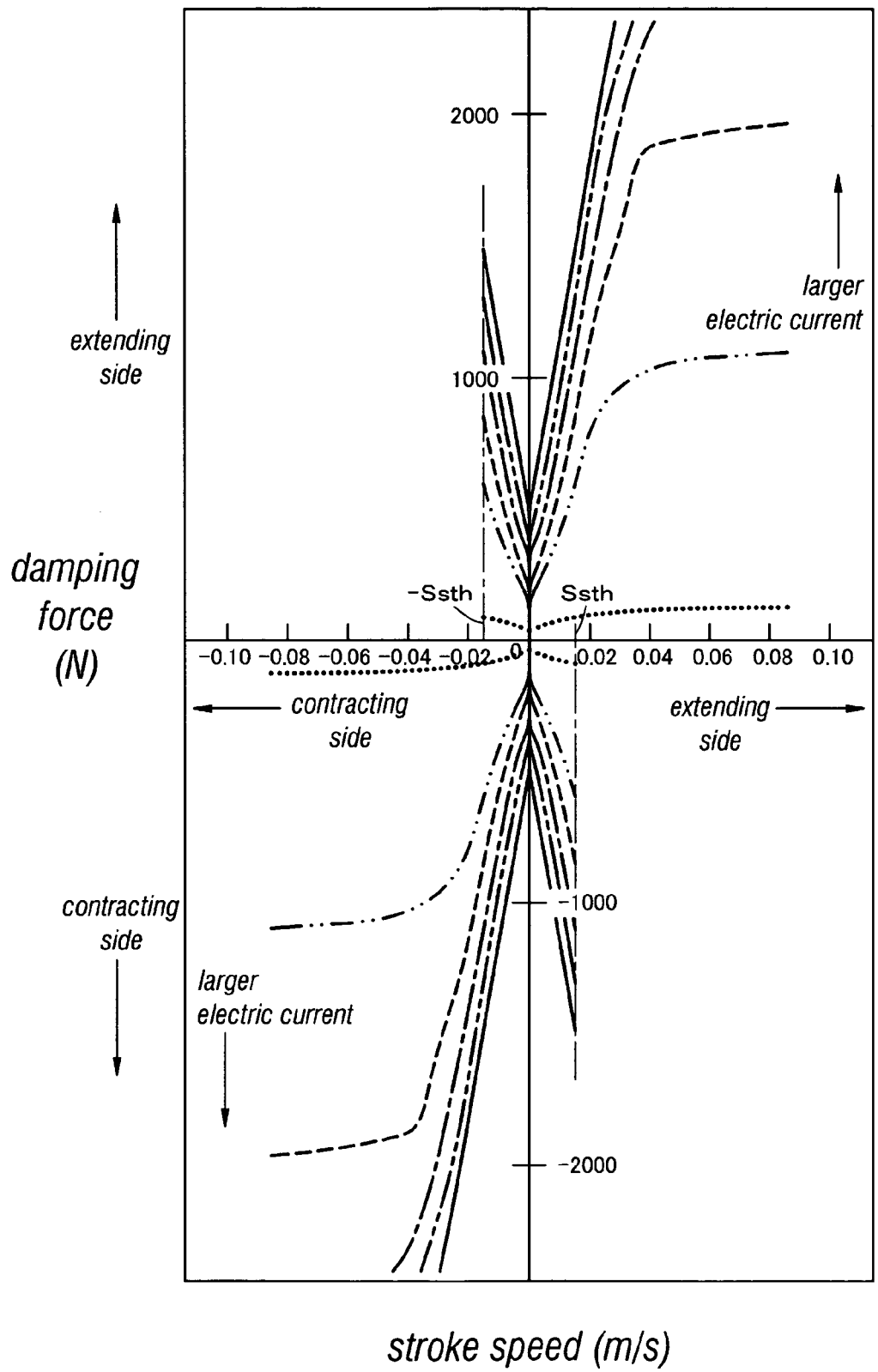
FIG. 8 is an enlarged view of a part of FIG. 5 indicated by VIII.
Figure 9:
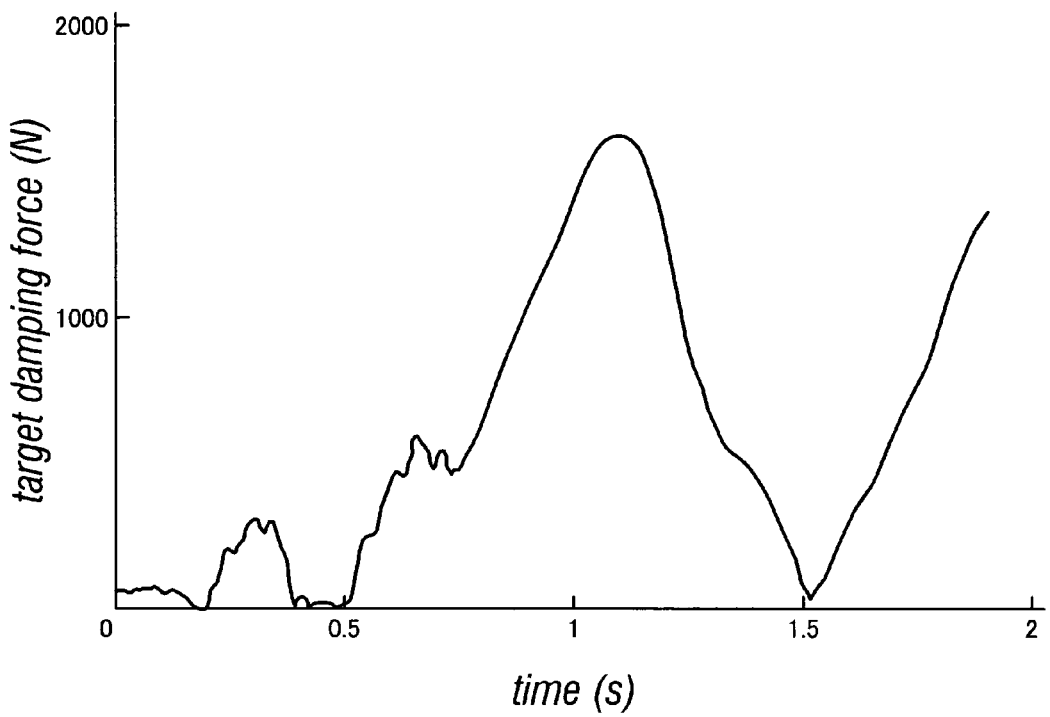
FIG. 9 is a time history of the target damping force for showing the mode of operation of the first embodiment.
Figure 10:
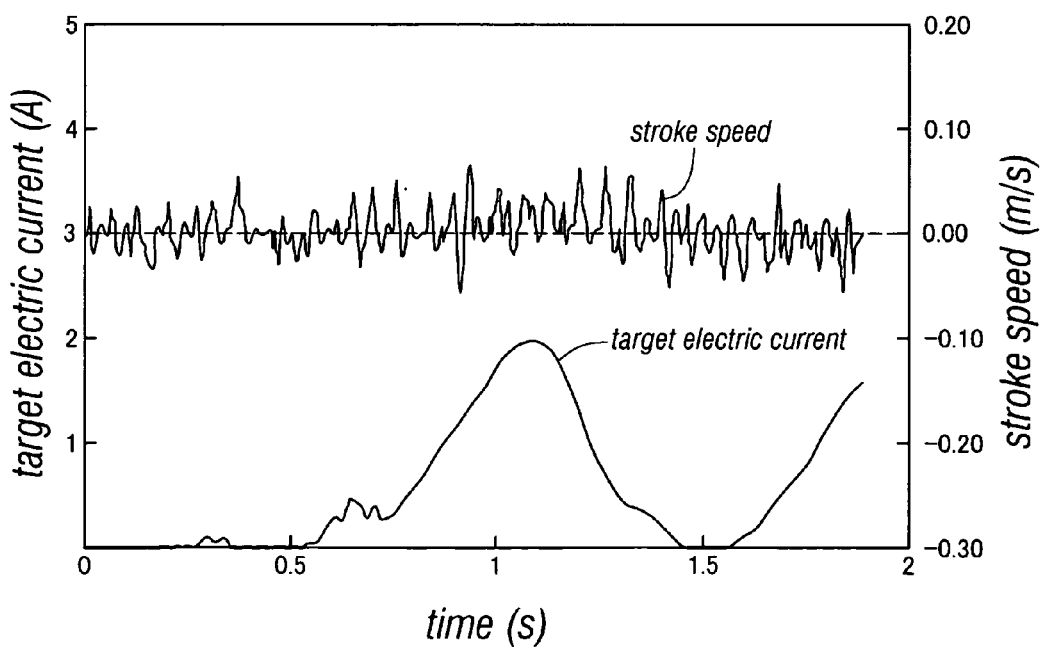
FIG. 10 is a time history of the target current and the stroke speed for showing the mode of operation of the first embodiment.

Upon executing step S11 in FIG. 4, the damper control device 50 regards the direction of the target damping force Dtgt as being the same as the direction of the stroke movement of the damper 4 in step S12, looks up a target drive electric current Itgt from the drive electric current map according to the target damping force Dtgt and the stroke speed in step 8, and supplies the corresponding drive electric current to the MLV coil 40 of each damper 4. For instance, if the target damping force is in extending direction, as shown in the upper part of FIG. 8 (enlarged view of the part of FIG. 5 indicated by VIII), the same target current is determined when the stroke is in the contracting direction as when the stroke is in the extending direction. Therefore, in the illustrated embodiment, when the target damping force is in the extending direction as shown in FIG. 9, even when the stroke direction changes at a short interval between the extending direction and contracting direction, the prescribed target value Itgt which is free from frequent changes is obtained, and the damper 4 is allowed to produce a damping force of an appropriate level as shown in FIG. 10. As shown in the lower part of FIG. 8, when the target damping force is in the contracting direction, the same process as that for the extending direction is executed.

A second embodiment of the present invention is described in the following. The second embodiment is similar to the first embodiment with respect to the structure of the damper, the structure of the damper control device and the process of controlling the damping force, but differs therefrom in the process of determining the target damping force in the prescribed range of the damper stroke speed. Therefore, the part common to the previous embodiment is omitted from the following description, and only the process of determining the target damping force is covered by the following description to avoid redundancy.

Figure 11:
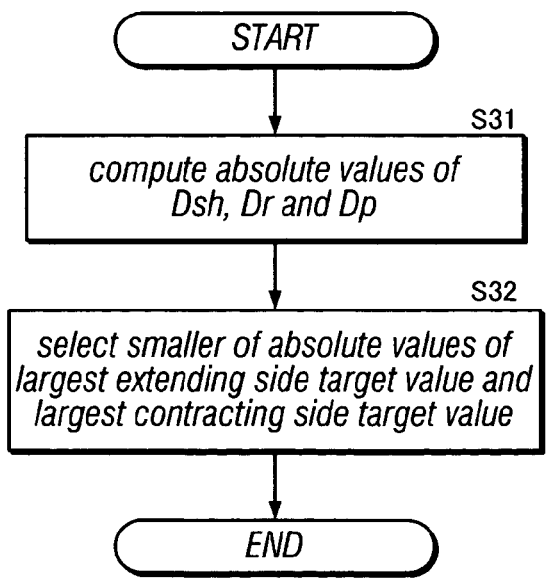
FIG. 11 is a flowchart showing the control flow of the process of determining the target damping force in the second embodiment of the present invention.

In the second embodiment, when the determination result of step S5 in FIG. 4 is No, the damper control device 50 executes in step S11 the process of determining the target damping force as shown in the flowchart of FIG. 11. Upon starting the process of determining the target damping force, the damper control device 50 computes the absolute values |Dsh|, |Dr| and |Dp| of the three control target values Dsh, Dr and Dp in step S31, and selects the smaller of the largest of the absolute values of the target damping forces in the damper extending direction (extension target damping force—the skyhook control target value Dsh in the illustrated embodiment) and the largest of the absolute values of the target damping forces in the damper contracting direction (contraction target damping force—the pitch control target value Dp in the illustrated embodiment) as the final target damping force Dtgt (the pitch control target value Dp in the illustrated embodiment) as illustrated in step S22 of the flowchart shown in FIG. 11.

Figure 12:
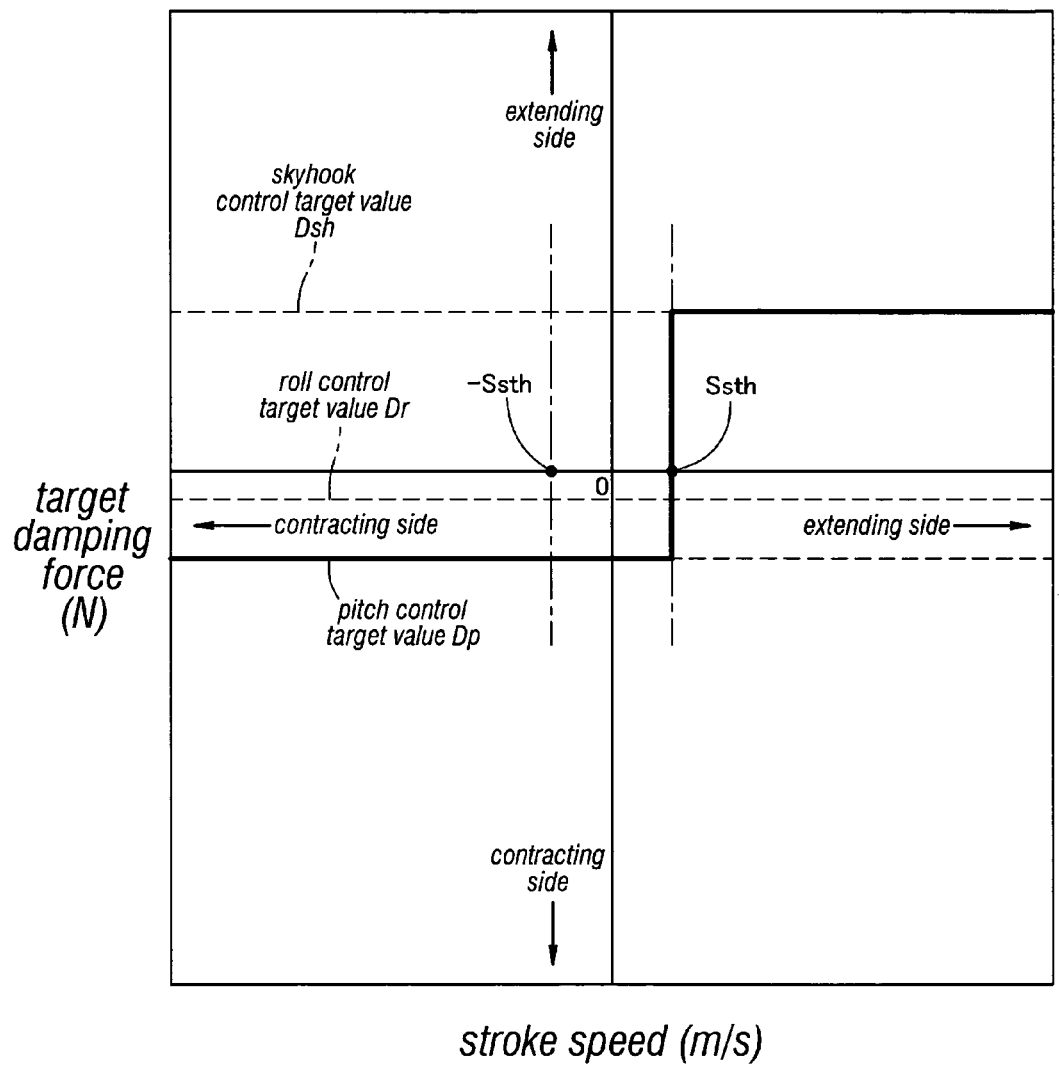
FIG. 12 is a graph showing the relationship between the damper stroke speed and the target damping force in the second embodiment of the present invention.

This is illustrated in the diagram of FIG. 12 which shows that the target damping force, when the stroke speed in the prescribed range (−Ssth<Ss<Ssth), is made equal to that of the damping force for the contracting side which is the smaller of the largest of the absolute values of the target damping forces in the damper extending direction and the largest of the absolute values of the target damping forces in the damper contracting direction. Therefore, when the stroke speed Ss is near zero, the target damping force Dtgt is determined as a relatively small value, and this is effective in improving the ride quality of the vehicle.

It should be noted that if the three target damping forces have a same sign, for instance are all in the extending side, the largest of the absolute values of the target damping forces in the damper contracting direction will be given as zero. Conversely, if the three target damping forces are all in the contracting side, the largest of the absolute values of the target damping forces in the damper extending direction will be given as zero.

A third embodiment of the present invention is described in the following. The third embodiment is similar to the first embodiment with respect to the structure of the damper, the structure of the damper control device and the process of controlling the damping force, but differs therefrom in the process of determining the target damping force in the prescribed range of the damper stroke speed. Therefore, the part common to the previous embodiment is omitted from the following description, and only the process of determining the target damping force is covered by the following description to avoid redundancy.

Figure 13:
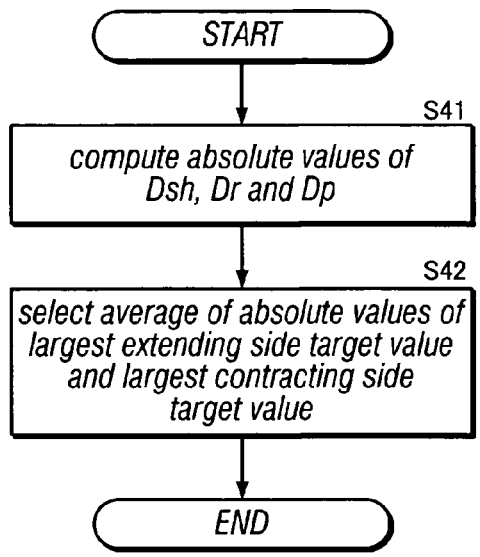
FIG. 13 is a flowchart showing the control flow of the process of determining the target damping force in the third embodiment of the present invention.

In the third embodiment, when the determination result of step S5 in FIG. 4 is No, the damper control device 50 executes in step S11 the process of determining the target damping force as shown in the flowchart of FIG. 13. Upon starting the process of determining the target damping force, the damper control device 50 computes the absolute values |Dsh|, |Dr| and |Dp| of the three control target values Dsh, Dr and Dp in step S41, and computes the average value of the largest of the absolute values of the target damping forces in the damper extending direction (extension target damping force—the skyhook control target value Dsh in the illustrated embodiment) and the largest of the absolute value of the target damping forces in the damper contracting direction (contraction target damping force—the pitch control target value Dp in the illustrated embodiment) as the final target damping force Dtgt as illustrated in step S42 of the flowchart shown in FIG. 13. Therefore, when the stroke speed Ss is near zero, the target damping force Dtgt is determined as an average value of the absolute values.

Figure 14:
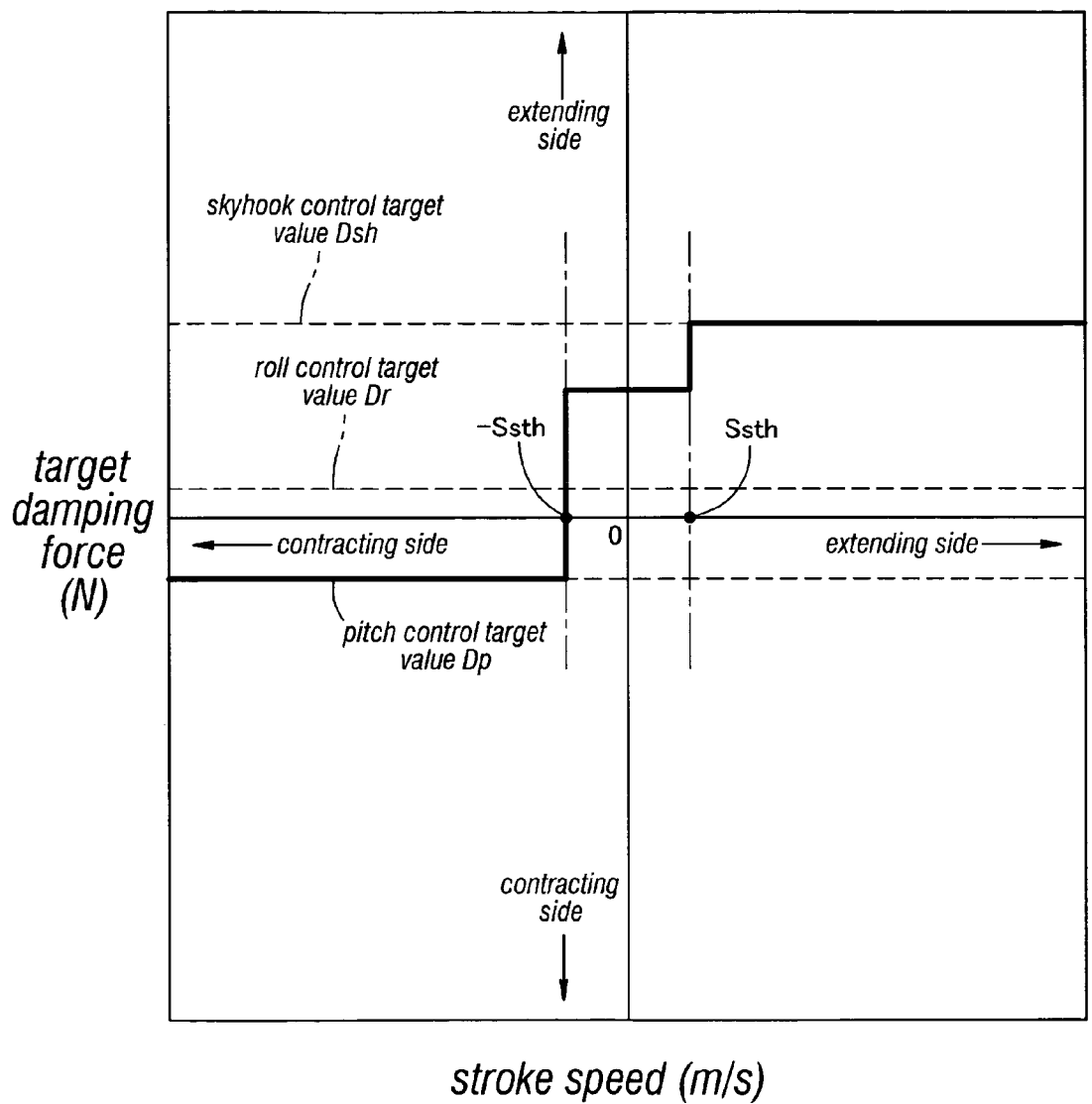
FIG. 14 is a graph showing the relationship between the damper stroke speed and the target damping force in the third embodiment of the present invention.

This is illustrated in the diagram of FIG. 14 which shows that the target damping force, when the stroke speed is in the prescribed range (−Ssth<Ss<Ssth), is given as an average of the largest of the absolute values of the target damping forces in the damper extending direction and the largest of the absolute values of the target damping forces in the damper contracting direction so that both a favorable ride quality and a favorable motion stability can be achieved at the same time. The averaging method is not limited to the one used in this embodiment, but may consist of averaging the absolute values of target damping forces given by different control modes in variously different ways such as averaging the absolute values of all of the three target damping forces, for instance, and different weights may also be assigned to the target damping forces.

It should be noted that if the three target damping forces have a same sign, for instance are all in the extending side, the largest of the absolute values of the target damping forces in the damper contracting direction will be given as zero. Conversely, if the three target damping forces are all in the contracting side, the largest of the absolute values of the target damping forces in the damper extending direction will be given as zero. This principle applies to any of the applicable embodiments given hereinafter.

A fourth embodiment of the present invention is described in the following. The fourth embodiment is similar to the first embodiment with respect to the structure of the damper, the structure of the damper control device and the process of controlling the damping force, but differs therefrom in the process of determining the target damping force in the prescribed range of the damper stroke speed. Therefore, the part common to the previous embodiment is omitted from the following description, and only the process of determining the target damping force is covered by the following description to avoid redundancy.

Figure 15:
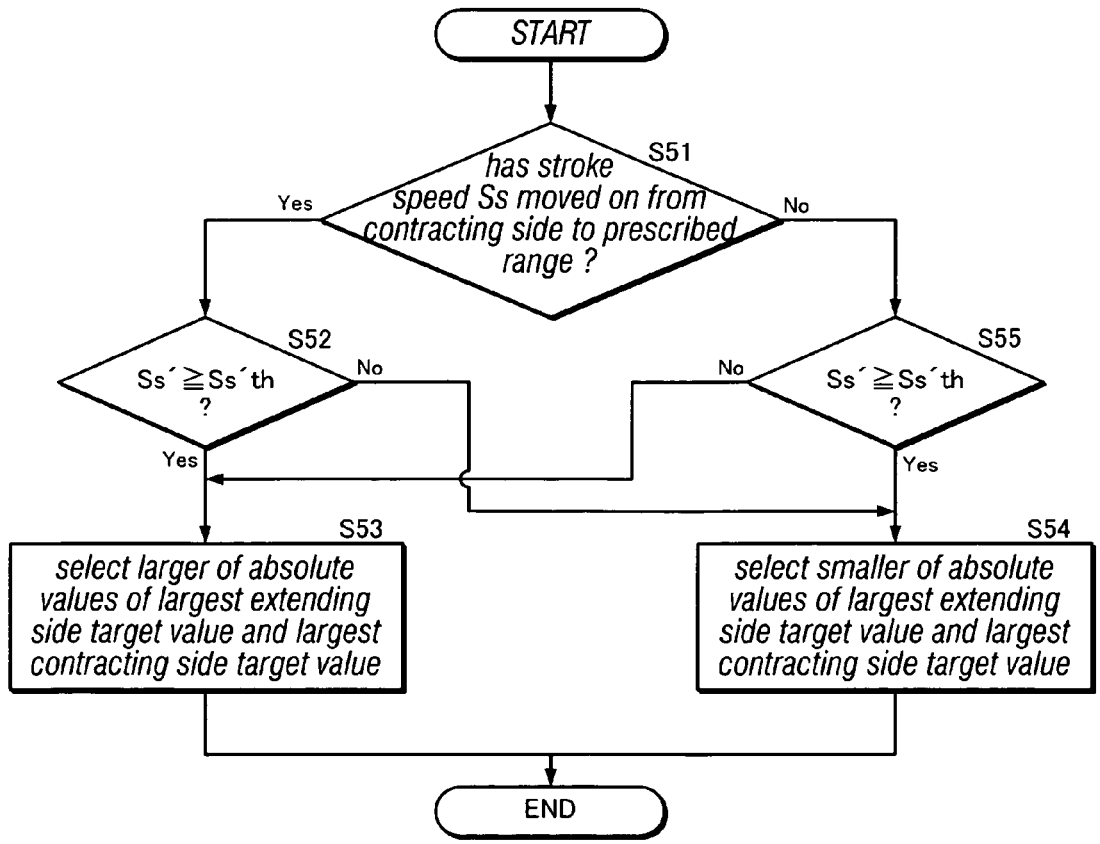
FIG. 15 is a flowchart showing the control flow of the process of determining the target damping force in the fourth embodiment of the present invention.

In the fourth embodiment, when the determination result of step S5 in FIG. 4 is No, the damper control device 50 executes in step S11 the process of determining the target damping force as shown in the flowchart of FIG. 15. Upon starting the process of determining the target damping force, the damper control device 50 determines if the stroke speed Ss has moved on from a damper contracting state to the prescribed range including zero speed in step S51 of FIG. 15. If the determination result is Yes, it is determined in step S52 if a time change of the stroke speed Ss (time differential value Ss') is greater than a prescribed threshold value Ss'th. If the determination result is Yes, as it means that the stroke speed Ss is likely to change from a negative value to a positive value, the damper control device 50 selects the larger of the largest of the absolute values of the target damping forces in the damper extending direction (extension target damping force—the skyhook control target value Dsh in the illustrated embodiment) and the largest of the absolute value of the target damping forces in the damper contracting direction (contraction target damping force—the pitch control target value Dp in the illustrated embodiment) as the final target damping force Dtgt (the skyhook control target value Dsh in the illustrated embodiment) in step S53 of the flowchart shown in FIG. 15 as indicated by the solid line arrows in FIG. 16.

Figure 16:
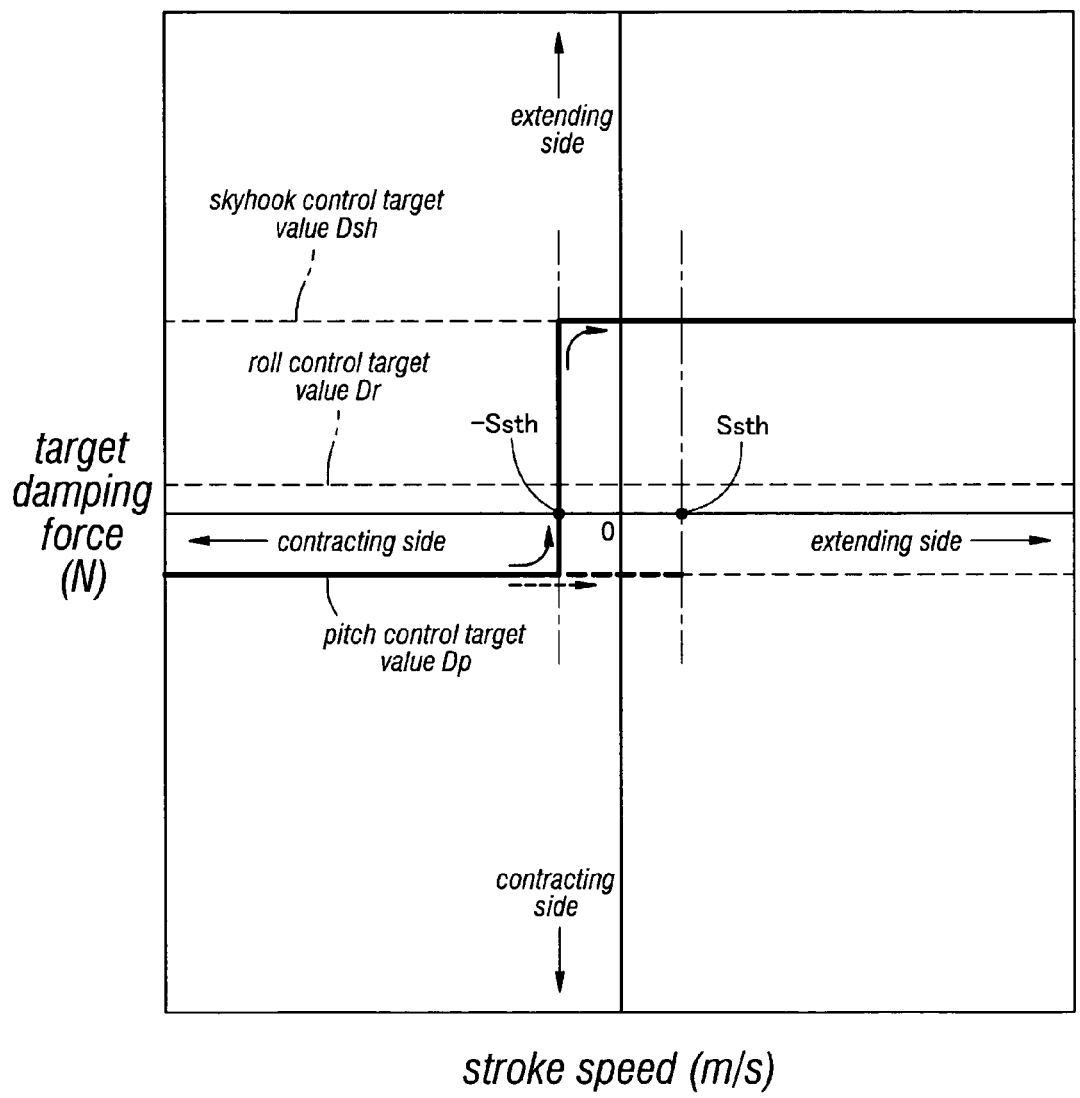
FIGS. 16 and 17 are graphs showing the relationship between the damper stroke speed and the target damping force in the fourth embodiment of the present invention.

Conversely, if the determination result is Yes in step S52, as it means that the stroke speed Ss is not likely to change from a negative value to a positive value, the damper control device 50 selects the smaller of the largest of the absolute values of the target damping forces in the damper extending direction (extension target damping force—the skyhook control target value Dsh in the illustrated embodiment) and the largest of the absolute value of the target damping forces in the damper contracting direction (contraction target damping force—the pitch control target value Dp in the illustrated embodiment) as the final target damping force Dtgt (the pitch control target value Dp in the illustrated embodiment) in step S54 of the flowchart shown in FIG. 15 as indicated by the dotted line arrow in FIG. 16.

On the other hand, if the stroke speed Ss has moved on from a damper extending state to the prescribed range including zero speed in step S51 of FIG. 15 (No in step S51), the damper control device 50 determines if the time change of the stroke speed Ss (differential value Ss') is greater than a prescribed threshold value Ss'th in step S55. If the determination result is Yes, as it means that the stroke speed Ss is likely to change from a positive value to a negative value, the damper control device 50 selects the smaller of the largest of the absolute values of the target damping forces in the damper extending direction and the largest of the absolute value of the target damping forces in the damper contracting direction as the final target damping force Dtgt (the pitch control target value Dp in the illustrated embodiment) in step S54 of the flowchart shown in FIG. 15 as indicated by the solid line arrows in FIG. 17.

Figure 17:
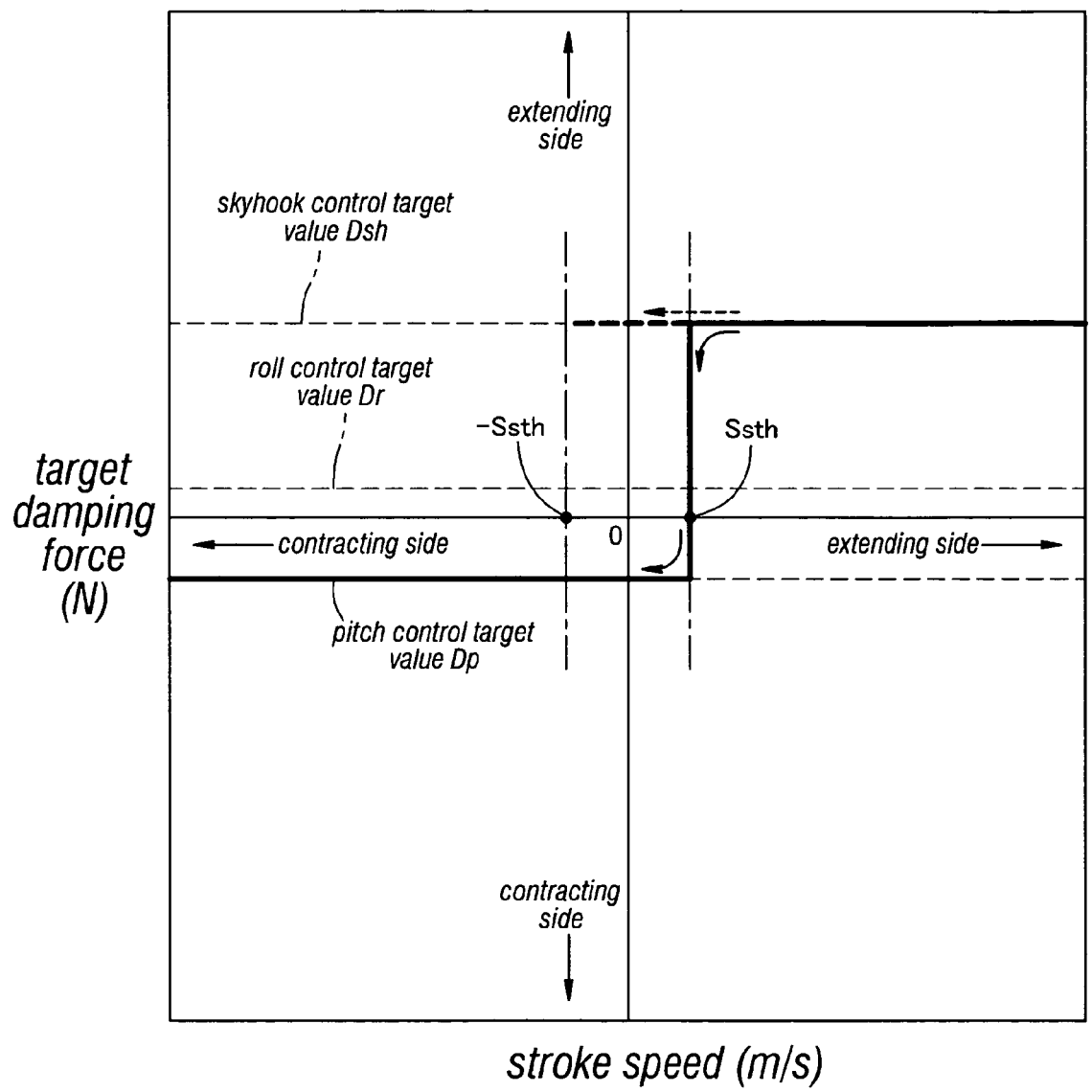

Conversely, if the determination result is No in step S55, as it means that the stroke speed Ss is not likely to change from a positive value to a negative value, the damper control device 50 selects the larger of the largest of the absolute values of the target damping forces in the damper extending direction and the largest of the absolute values of the target damping forces in the damper contracting direction as the final target damping force Dtgt (the skyhook control target value Dsh in the illustrated embodiment) in step S53 of the flowchart shown in FIG. 15 as indicated by the dotted line arrow in FIG. 17.

In the foregoing embodiment, a delay in the control response owing to a lag in the rise of the drive electric current can be effectively avoided, and the motion stability and ride quality of the vehicle can be both improved.

A fifth embodiment of the present invention is described in the following. The fifth embodiment is similar to the first embodiment with respect to the structure of the damper, the structure of the damper control device and the process of controlling the damping force, but differs therefrom in the process of determining the target damping force in the prescribed range of the damper stroke speed. Therefore, the part common to the previous embodiment is omitted from the following description, and only the process of determining the target damping force is covered by the following description to avoid redundancy.

Figure 18:
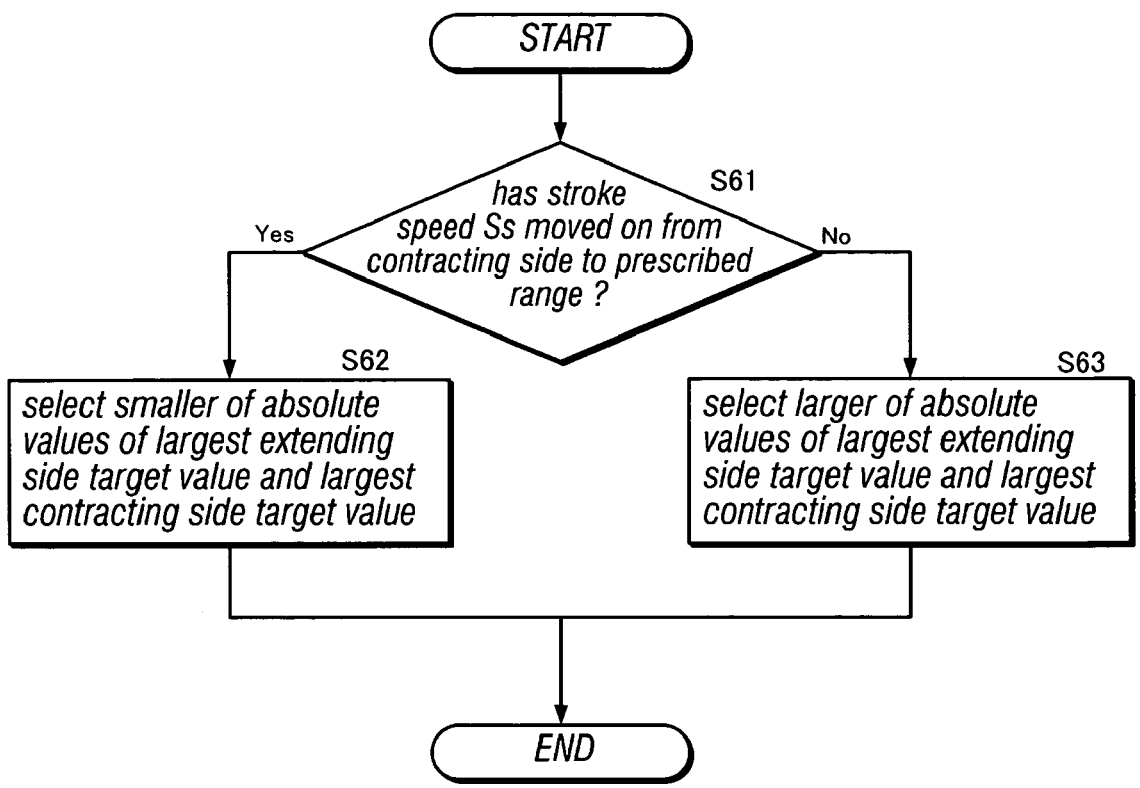
FIG. 18 is a flowchart showing the control flow of the process of determining the target damping force in the fifth embodiment of the present invention.
Figure 19:
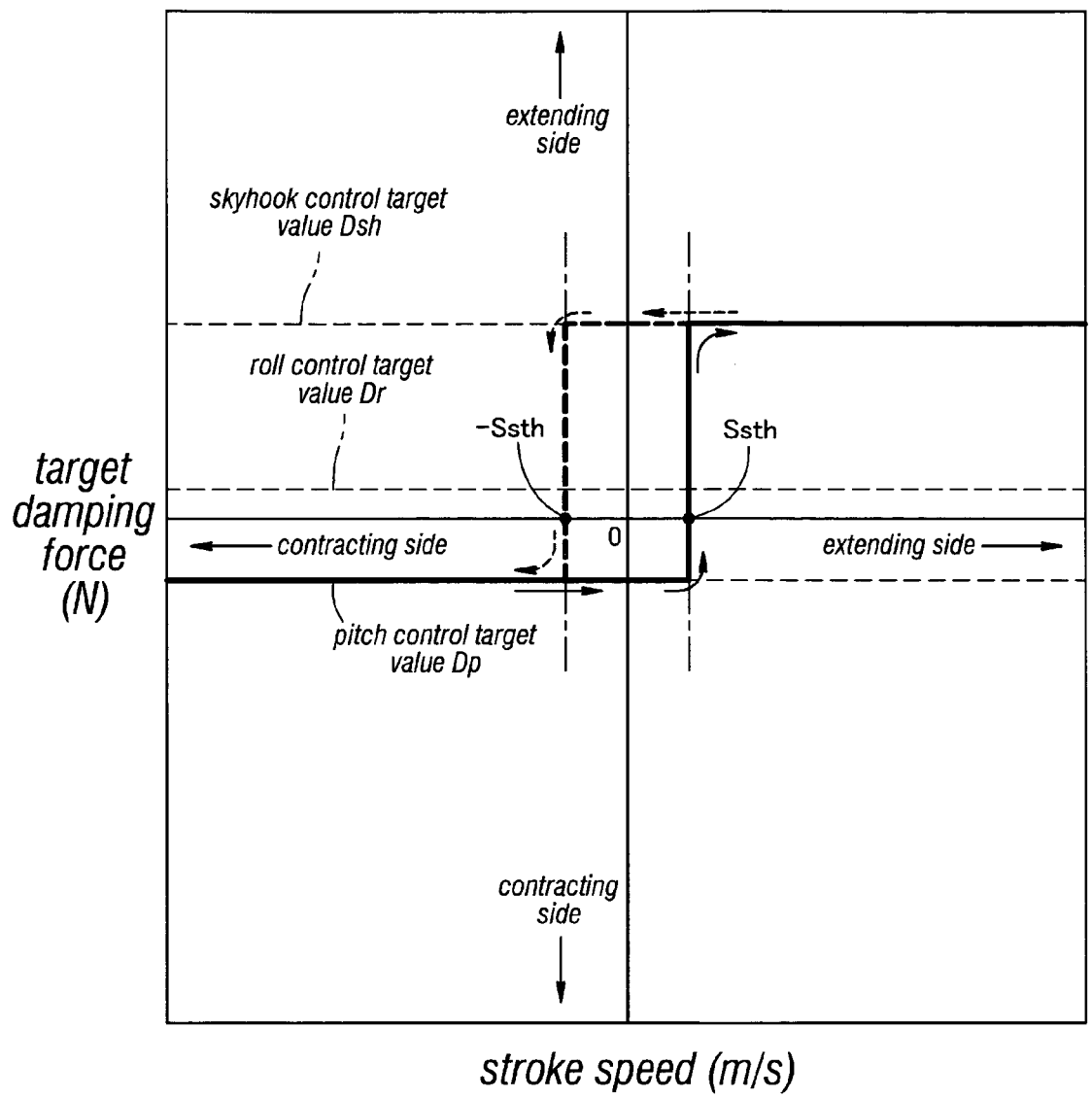
FIG. 19 is a graph showing the relationship between the damper stroke speed and the target damping force in the fifth embodiment of the present invention.

In the fifth embodiment, when the determination result of step S5 in FIG. 4 is No, the damper control device 50 executes in step S11 the process of determining the target damping force as shown in the flowchart of FIG. 18. Upon starting the process of determining the target damping force, the damper control device 50 determines if the stroke speed Ss has moved on from a damper contracting state to the prescribed range including zero speed in step S61 of FIG. 18. If the determination result in step S61 is Yes, the damper control device 50 selects the smaller of the largest of the absolute values of the target damping forces in the damper extending direction and the largest of the absolute values of the target damping forces in the damper contracting direction as the final target damping force Dtgt (the pitch control target value Dp in the illustrated embodiment) in step S62 of the flowchart shown in FIG. 18 as indicated by the solid line arrows in FIG. 19. Conversely, if the determination result is No in step S61 or the stroke speed Ss has moved on from a damper extending state to the prescribed range including zero speed, the damper control device 50 selects the larger of the largest of the absolute values of the target damping forces in the damper extending direction and the largest of the absolute values of the target damping forces in the damper contracting direction as the final target damping force Dtgt (the skyhook control target value Dsh in the illustrated embodiment) in step S54 of the flowchart shown in FIG. 18 as indicated by the dotted line arrows in FIG. 19.

Thereby, even when the stroke speed Ss is near zero and the detection signal of the stroke sensor 12 contains noises, the final target damping force Dtgt is prevented from changing rapidly, and this improves the ride quality of the vehicle.

A sixth embodiment of the present invention is described in the following. The sixth embodiment is similar to the first to the fifth embodiments with respect to the structure of the damper, the structure of the damper control device and the process of controlling the damping force, but differs therefrom in the contents of the drive electric current map. Therefore, the feature of the sixth embodiment may be combined with any of the preceding embodiments. In the following description, the part common to the previous embodiment is omitted from the following description, and only the process of determining the target damping force is covered by the following description to avoid redundancy.

Figure 20:
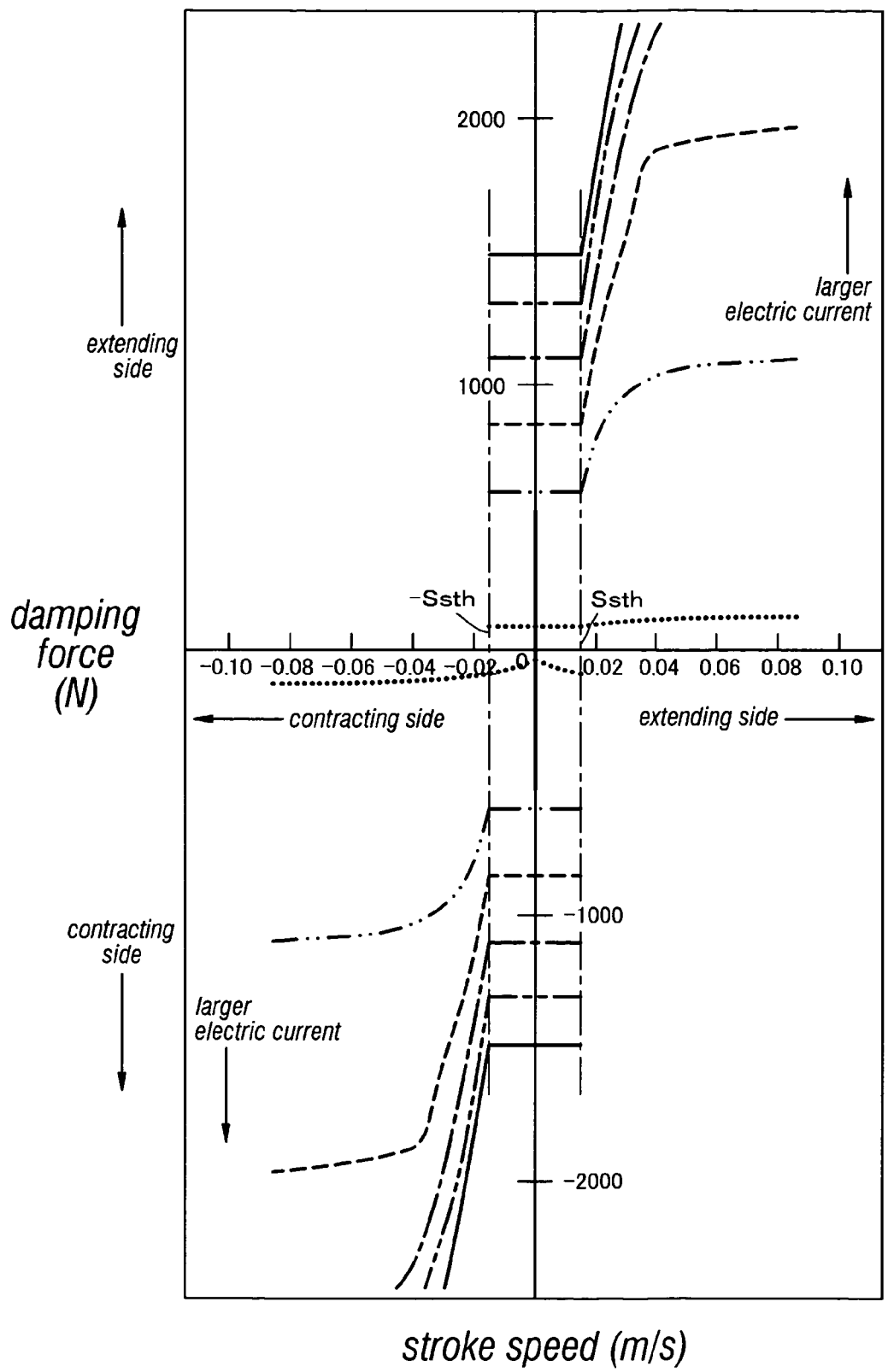
FIG. 20 is a graph showing the drive electric current map in the sixth embodiment of the present invention.

As shown in FIG. 20, in the drive electric current map of the sixth embodiment, the target current Itgt is selected to be a substantially smaller value for each given target damping force when the absolute value of the stroke speed of the damper is within a prescribed range including zero (−Ssth<Ss<Ssth). Thereby, even when the stroke speed Ss is near zero and the target damping force changes rapidly at short intervals, for instance, owing to the noises in the lateral G sensor 10 and the fore-and-aft G sensor 11, the final target damping force Dtgt is prevented from changing rapidly, and this improves the ride quality and the motion stability of the vehicle when the vehicle is traveling straight at a constant speed. In this embodiment, the target current Itgt when the absolute value of the stroke speed of the damper is within the prescribed range including zero was made smaller for a given target damping force by setting it at a fixed value equal to the corresponding value at Ss=−Ssth or Ss=Ssth, but may be made even smaller by setting them smaller than the corresponding values at Ss=−Ssth and Ss=Ssth.

A seventh embodiment of the present invention is described in the following. The seventh embodiment is similar to the first to the fifth embodiments with respect to the structure of the damper, the structure of the damper control device and the process of controlling the damping force, but differs therefrom in changing the prescribed range including zero and the target current depending on the operating condition of the damper and/or the behavior of the vehicle. This is intended to prevent the overshooting and undershooting of the damping force when the damper 4 oscillates at frequencies higher than the sprung mass resonant frequency and/or to increase the damping force when a rolling movement and/or pitching movement are anticipated so that an abrupt change in the behavior of the vehicle may be avoided. It should be noted that the feature of the seventh embodiment may be combined with any of the preceding embodiments. In the following description, the part common to the previous embodiment is omitted from the following description, and only the process of changing the prescribed range including zero and the target current is covered by the following description to avoid redundancy.

Figure 21:
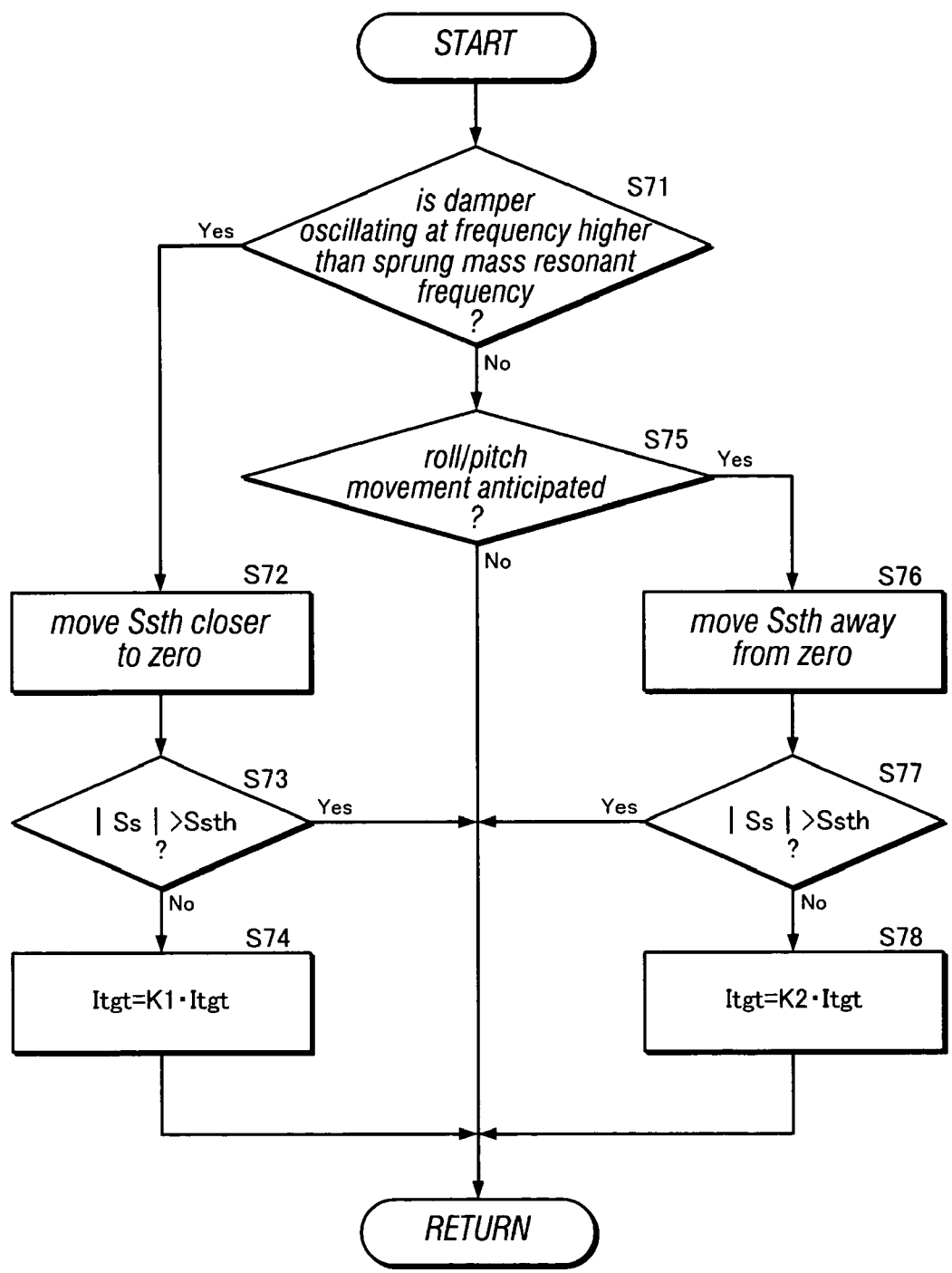
FIG. 21 is a flowchart showing the process of the change configuration control in the seventh embodiment of the present invention.

In the seventh embodiment, a change configuration control shown in FIG. 21 is executed in parallel with any of the foregoing damping force controls. Upon starting the change configuration control, the damping force control device 50 determines in step S71 of FIG. 21 if the damper 4 is oscillating at a frequency higher than the sprung mass resonant frequency (such as 1.3 Hz) or if the vehicle V is traveling over a road surface having small irregularities.

Figure 22:
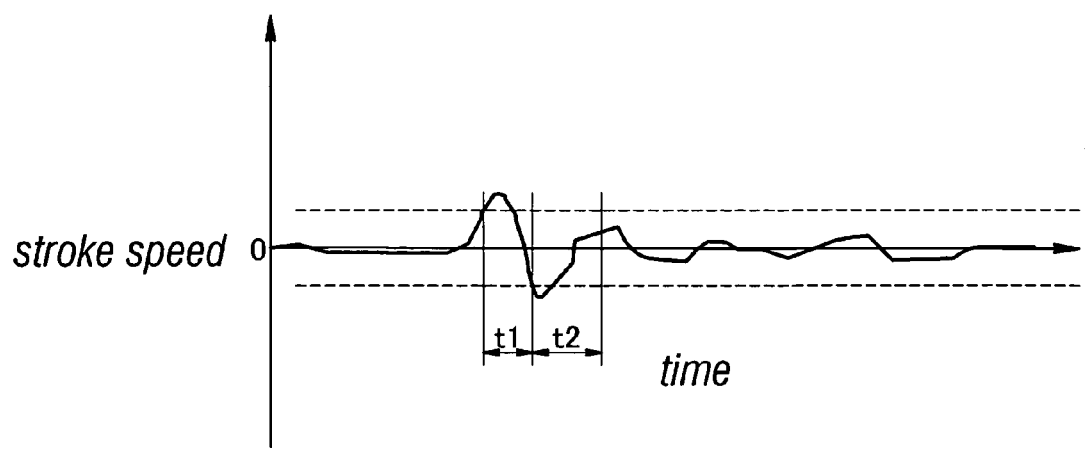
FIG. 22 is a graph showing the changes in the stroke speed when the vehicle is traveling in the seventh embodiment.

In this embodiment, the frequency of the damper movement can be obtained as an inverse of twice a time period t1 which is required for the damper stroke speed Ss to cross one of the positive and negative threshold values and cross the other of the positive and negative threshold values as illustrated in FIG. 22. If more than a time period t2 (one half of the period of the resonant frequency of the sprung mass) has elapsed without the stroke speed crossing either threshold value (positive or negative threshold value) since the stroke speed last crossed either threshold value, it is determined that the oscillation of the damper 5 at a frequency higher than the resonant frequency of the sprung mass has abated (the road surface irregularities have disappeared). This determination process may be replaced with various other determination processes which may be based on the interval of reversing the stroke speed Ss, the vertical acceleration of the vehicle body 1, the interval of reversing the vertical acceleration of the vehicle body 1, the vertical acceleration of the wheel 3, the interval of reversing the vertical acceleration of the wheel 3, the interval of reversing the fore-and-aft acceleration of the vehicle body 1, the interval of reversing the lateral acceleration of the vehicle body 1, and so on. This determining process may also be executed by using suitable filters, and detecting the amplitude of any particular band of the damper oscillation higher than the sprung mass resonant frequency which exceeds a prescribed threshold level.

When the determination result of step S71 is Yes, the damper control device 50 changes the value of the range threshold value Ssth closer to zero or narrow the prescribed range including zero. The damper control device 50 then determines if the absolute value of the stroke speed Ss of each damper 4 has exceeded the range threshold value Ssth or is outside the prescribed range including zero in step S73. If the determination result of step S73 is No, a predetermined decreasing factor K1 is multiplied to the target electric current Itgt to reduce it by a prescribed degree.

Figure 23:
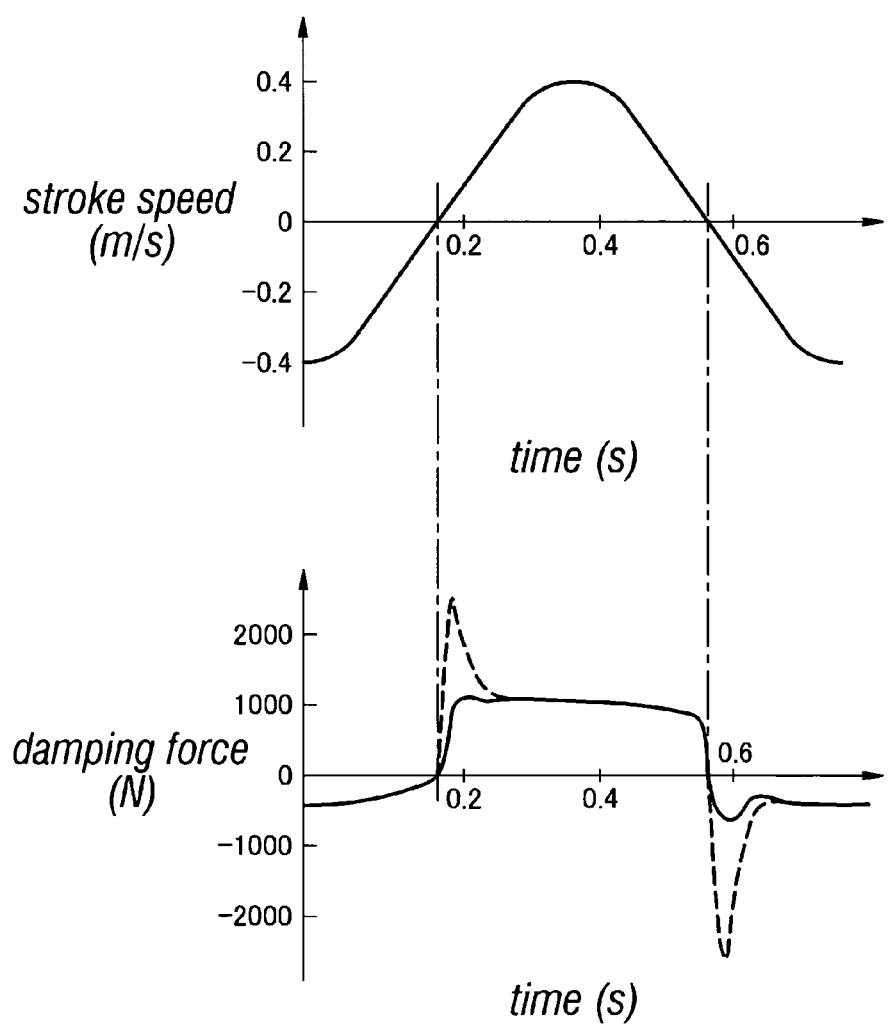
FIG. 23 is a graph showing the changes in the stroke speed and actual damping force in the seventh embodiment.
Figure 24:
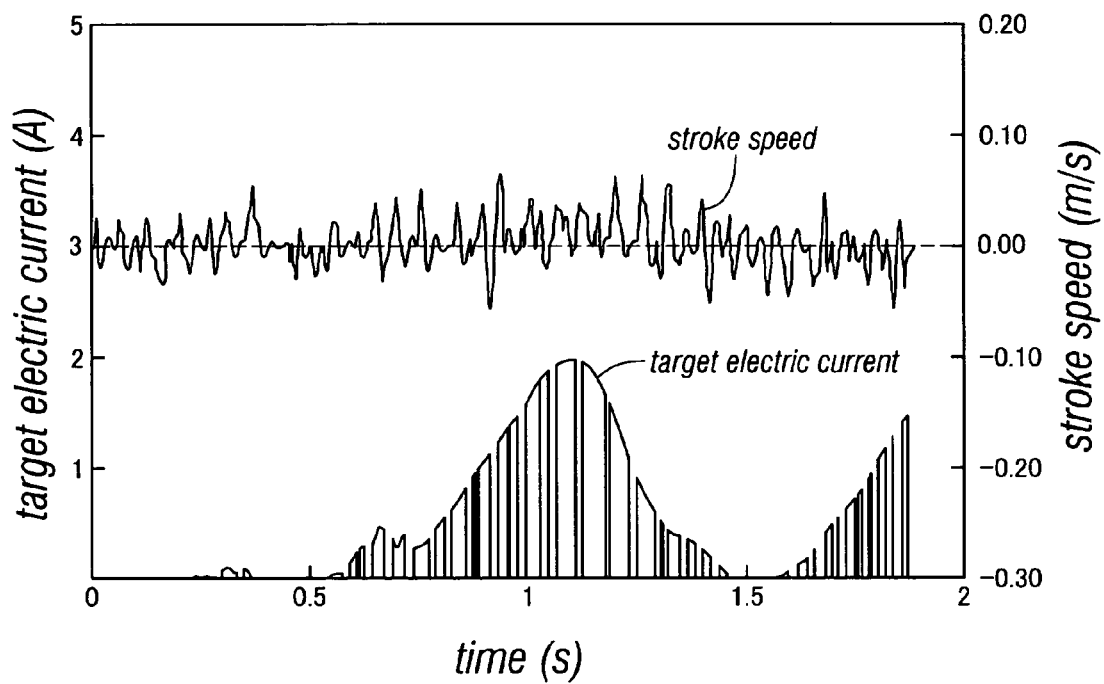
FIG. 24 is a graph showing the problems of the prior art.

FIG. 23 is a graph showing the relationship between the changes of the stroke speed Ss and actual damping force Dreal when the damper is oscillating at the sprung mass resonant frequency. As can be appreciated from the graph of FIG. 23, according to the first to sixth embodiments, the actual damping force Dreal (indicated by broken lines in FIG. 23) overshoots and undershoots to a significant extent because the changes in sign of the stroke speed Ss is disregarded when the stroke speed Ss is within the threshold range including zero and the target electric current in the prescribed range is relatively large. This is because a large target electric current is produced as soon as the stroke speed Ss has moved on from the contracting side to the prescribed range, for instance, and this results in a damping force which may be more pronounced than that when a normal control is being executed. However, in this embodiment, the actual damping force Dreal (indicated by the solid lines in FIG. 23) is free from such an overshoot or an undershoot because the prescribed range is made narrower and the target electric current is reduced from the normal value in the prescribed range.

On the other hand, when the determination result of step S71 in FIG. 21 is No, the damper control device 50 determines in step S75 if a rolling movement or a pitching movement of the vehicle body 1 is anticipated. In the illustrated embodiment, a rolling movement and a pitching movement of the vehicle body 1 are anticipated when the absolute value of the differential value of the lateral acceleration exceeds a prescribed value (such as 2 m/s$^3$) and when the absolute value of the differential value of the fore-and-aft acceleration exceeds a prescribed value (such as 2 m/s$^3$), respectively. It is also possible to use other indicators for anticipating a rolling movement or a pitching movement of the vehicle body, and such indicators may include a differential value of a lateral acceleration computed from the yaw rate and vehicle speed, and a differential value of a lateral acceleration computed from the steering angle and the vehicle speed.

If the determination result of step S75 is Yes, the damper control device 50 increases the range threshold value Ssth or widens the prescribed range including zero in step S76. The damper control device 50 then determines if the absolute value of the damper speed Ss of each damper has exceeded the range threshold value or is outside the prescribed range including zero in step S77. If the determination result in step S77 is No, a predetermined increasing factor K2 is multiplied to the target electric current Itgt to increase it by a prescribed degree in step S78. Thereby, the damping force of the damper 4 is increased before the vehicle body 1 starts a rolling movement or a pitching movement so that an abrupt change in the vehicle behavior can be favorably controlled and the response of the vehicle to a steering operation and an acceleration can be improved.

Although the present invention has been described in terms of preferred embodiments thereof, it is obvious to a person skilled in the art that various alterations and modifications are possible without departing from the scope of the present invention which is set forth in the appended claims. For instance, the variable damper may consist of a mechanically variable damper instead of a MRF damper. In such a case, the control variable may consist of an opening angle of a rotary valve or other value corresponding to a valve opening area. Also, the threshold value of the prescribed range may have different absolute values for the extending side and contracting side.

The contents of the original Japanese patent applications on which the Paris Convention priority claim is made for the present application, as well as those of the prior art references mentioned in the present application are hereby incorporated in this application by reference. Also, one feature of a certain embodiment may be incorporated into another embodiment without departing from the spirit of the present invention.

The invention claimed is:

1. A control device for controlling a variable damper of a vehicle suspension system, comprising:
   at least one sensor for detecting a dynamic state of a vehicle and a stroke sensor for detecting a movement of the damper;
   a target damping force determining unit for computing a target damping force of a vehicle, the target damping force being selectively directed in one of a contracting direction and an extending direction of a movement of the damper; and
   a control value determining unit for computing by a processor a control value of the damper according to the target damping force determined by the target damping force determining unit and a stroke speed detected by the stroke sensor,
   wherein the target damping force is determined by a same control value without regard to the direction of the movement of the damper when the stroke speed of the damper is within a range including a zero stroke speed.

2. The control device for controlling a variable damper of a vehicle suspension system according to claim 1, wherein the device comprises a plurality of target damping force determining units based on different control modes and each providing a corresponding target damping force, and, when the stroke speed of the damper is outside the range including a zero stroke speed, the target damping force is selected in such a manner that the target damping force determining unit selects one of the target damping forces which is largest in value for an extending movement of the damper, the selected target damping force being zero if the largest of the target damping forces is given as a force opposing a contracting movement of the damper, and the target damping force determining unit selects one of the target damping forces which is smallest in value for a contracting movement of the damper, the selected target damping force being zero if the largest of the target damping forces is given as a force opposing an extending movement of the damper.

3. The control device for controlling a variable damper of a vehicle suspension system according to claim 1, wherein the device comprises a plurality of target damping force determining units based on different control modes and each providing a corresponding target damping force, and, when the stroke speed of the damper is within the range including a zero stroke speed, the target damping force is selected as a larger of the largest of the absolute values of the target damping forces in the damper extending direction and the largest of the absolute values of the target damping forces in the damper contracting direction.

4. The control device for controlling a variable damper of a vehicle suspension system according to claim 1, wherein the device comprises a plurality of target damping force determining units based on different control modes and each providing a corresponding target damping force, and, when the stroke speed of the damper is within the range including a zero stroke speed, the target damping force is selected as a smaller of the largest of the absolute values of the target damping forces in the damper extending direction and the largest of the absolute value of the target damping forces in the damper contracting direction.

5. The control device for controlling a variable damper of a vehicle suspension system according to claim 1, wherein the device comprises a plurality of target damping force determining units based on different control modes and each providing a corresponding target damping force, and, when the stroke speed of the damper is within the range including a zero stroke speed, the target damping force is selected as an average value of the absolute values of the target damping forces in either direction.

6. The control device for controlling a variable damper of a vehicle suspension system according to claim 5, wherein the target damping force is selected as an average of the largest of the absolute values of the target damping forces in the damper extending direction and the largest of the absolute values of the target damping forces in the damper contracting direction.

7. The control device for controlling a variable damper of a vehicle suspension system according to claim 1,
wherein the device comprises a plurality of target damping force determining units based on different control modes and each providing a corresponding target damping force, and
when the stroke speed has moved on from a damper contracting side to the prescribed range, the target damping force is selected as a larger of the largest of the absolute values of the target damping forces in the damper extending direction and the largest of the absolute values of the target damping forces in the damper contracting direction when a change rate of the stroke speed is greater than a prescribed threshold value, and a smaller of the largest of the absolute values of the target damping forces in the damper extending direction and the largest of the absolute values of the target damping forces in the damper contracting direction when a change rate of the stroke speed is smaller than a prescribed threshold value; and
when the stroke speed has moved on from a damper extending side to the prescribed range, the target damping force is selected as a smaller of the largest of the absolute values of the target damping forces in the damper extending direction and the largest of the absolute values of the target damping forces in the damper contracting direction when a change rate of the stroke speed is greater than a prescribed threshold value, and a larger of the largest of the absolute values of the target damping forces in the damper extending direction and the largest of the absolute values of the target damping forces in the damper contracting direction when a change rate of the stroke speed is smaller than a prescribed threshold value.

8. The control device for controlling a variable damper of a vehicle suspension system according to claim 1,
wherein the device comprises a plurality of target damping force determining units based on different control modes and each providing a corresponding target damping force, and
when the stroke speed has moved on from a damper contracting side to the prescribed range, the target damping force is selected as a smaller of the largest of the absolute values of the target damping forces in the damper extending direction and the largest of the absolute values of the target damping forces in the damper contracting direction; and
when the stroke speed has moved on from a damper extending side to the prescribed range, the target damping force is selected as a larger of the largest of the absolute values of the target damping forces in the damper extending direction and the largest of the absolute values of the target damping forces in the damper contracting direction.

9. The control device for controlling a variable damper of a vehicle suspension system according to claim 1, wherein the control value determined by the target damping force determining unit according to a given target damping force is reduced from a normal value when the stroke speed of the damper is within a range including a zero stroke speed.

10. The control device for controlling a variable damper of a vehicle suspension system according to claim 1, further comprising a means for detecting an oscillating frequency of the damper stroke,
wherein, when the stroke speed of the damper is within a range including a zero stroke speed and the oscillating frequency of the damper stroke is determined to be about equal to or higher than an unsprung mass resonant frequency, at least one of two measures is taken, the measures consisting of narrowing the prescribed range and reducing the control value determined by the target damping force determining unit according to a given target damping force from a normal value is taken.

11. The control device for controlling a variable damper of a vehicle suspension system according to claim 1, further comprising a means for anticipating at least one of a rolling motion and a pitching motion of the vehicle,
wherein, when the stroke speed of the damper is within a range including a zero stroke speed and at least one of a rolling motion and a pitching motion of the vehicle is anticipated, at least one of two measures is taken, the measures consisting of broadening the prescribed range and increasing the control value determined by the target damping force determining unit according to a given target damping force from a normal value.

* * * * *